US012560848B2

(12) United States Patent
Lee et al.

(10) Patent No.: US 12,560,848 B2
(45) Date of Patent: Feb. 24, 2026

(54) DISPLAY PANEL STRUCTURE AND DRIVING METHOD THEREFOR

(71) Applicant: NSPECTRA CO., LTD, Daejeon (KR)

(72) Inventors: Dong Jin Lee, Suwon-si (KR); Chul Am Kim, Daejeon (KR); Hyo Sun Bae, Suwon-si (KR)

(73) Assignee: NSPECTRA CO., LTD, Daejeon (KR)

( * ) Notice: Subject to any disclaimer, the term of this patent is extended or adjusted under 35 U.S.C. 154(b) by 519 days.

(21) Appl. No.: 17/635,147

(22) PCT Filed: Nov. 14, 2019

(86) PCT No.: PCT/KR2019/015497
§ 371 (c)(1),
(2) Date: Feb. 14, 2022

(87) PCT Pub. No.: WO2021/029490
PCT Pub. Date: Feb. 18, 2021

(65) Prior Publication Data
US 2022/0276543 A1 Sep. 1, 2022

(30) Foreign Application Priority Data

Aug. 13, 2019 (KR) ........................ 10-2019-0098673
Aug. 13, 2019 (KR) ........................ 10-2019-0098697
(Continued)

(51) Int. Cl.
*G02F 1/167* (2019.01)
*G02F 1/1676* (2019.01)
(52) U.S. Cl.
CPC ............ *G02F 1/167* (2013.01); *G02F 1/1676* (2019.01)

(58) Field of Classification Search
None
See application file for complete search history.

(56) References Cited

U.S. PATENT DOCUMENTS

2012/0188295 A1* 7/2012 Joo ........................... G02F 1/17
345/690
2015/0198858 A1* 7/2015 Chan ..................... G09G 3/344
359/296
(Continued)

FOREIGN PATENT DOCUMENTS

EP 1462847 A1 * 9/2004 ............ G02F 1/167
JP 2012-013784 A 1/2012
(Continued)

*Primary Examiner* — William R Alexander
*Assistant Examiner* — Mackenzi Waddell
(74) *Attorney, Agent, or Firm* — Vorys, Sater, Seymour and Pease LLP; Mih Suhn Koh

(57) ABSTRACT

Proposed are a display panel structure consisting of a composite material phase and capable of implementing four full colors and a transmission mode conversion, and a driving method therefor enabling conversion to a reflection mode, a shielding mode, and the transmission mode. The display panel structure includes: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region includes a plurality of first particles exhibiting a first color, a plurality of second particles exhibiting a second color, a plurality of third particles exhibiting a third color, and a plurality of fourth particles exhibiting a fourth color, the first, second, third, and fourth particles being dispersed in a fluid.

6 Claims, 20 Drawing Sheets

(30)        Foreign Application Priority Data

Aug. 13, 2019    (KR) ........................ 10-2019-0098713
Aug. 13, 2019    (KR) ........................ 10-2019-0098747

(56)              References Cited

U.S. PATENT DOCUMENTS

2015/0346577 A1 *  12/2015  Lee ........................ G02F 1/167
                                            359/296
2016/0041448 A1 *   2/2016  Lin ........................ G02F 1/167
                                            359/296

FOREIGN PATENT DOCUMENTS

| JP | 2014-006495 | A |   | 1/2014 |
|----|-------------|---|---|--------|
| JP | 2018-526685 | A |   | 9/2018 |
| KR | 2011074144 | A | * | 6/2011 |
| KR | 10-2018-0088495 | A |   | 8/2018 |
| KR | 10-1984763 | B1 |   | 5/2019 |

* cited by examiner

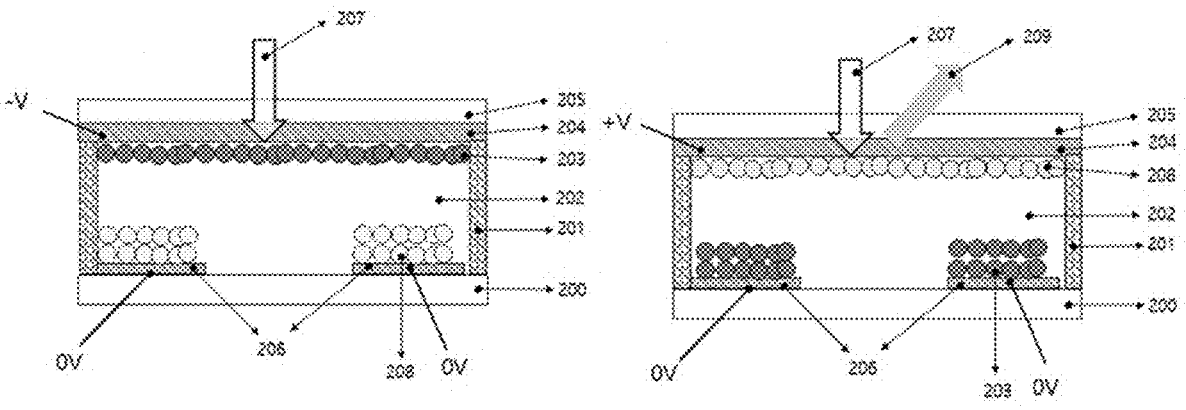
FIG. 2A                    FIG. 2B
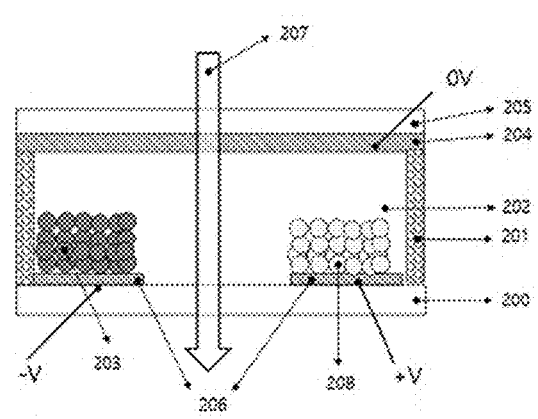
FIG. 2C                    FIG. 2D

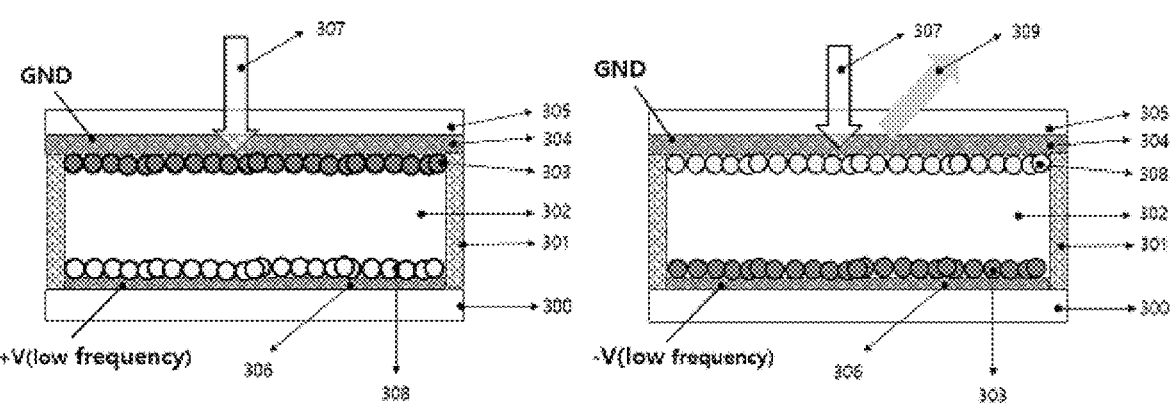
FIG. 3A                          FIG. 3B
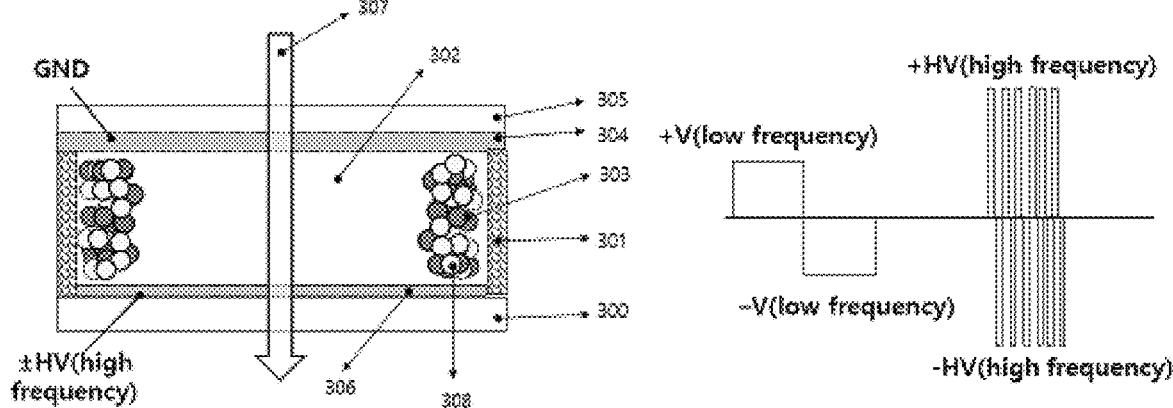
FIG. 3C                          FIG. 3D
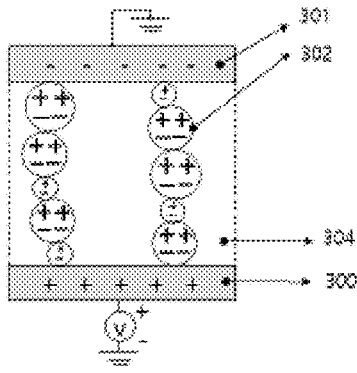
FIG. 3E

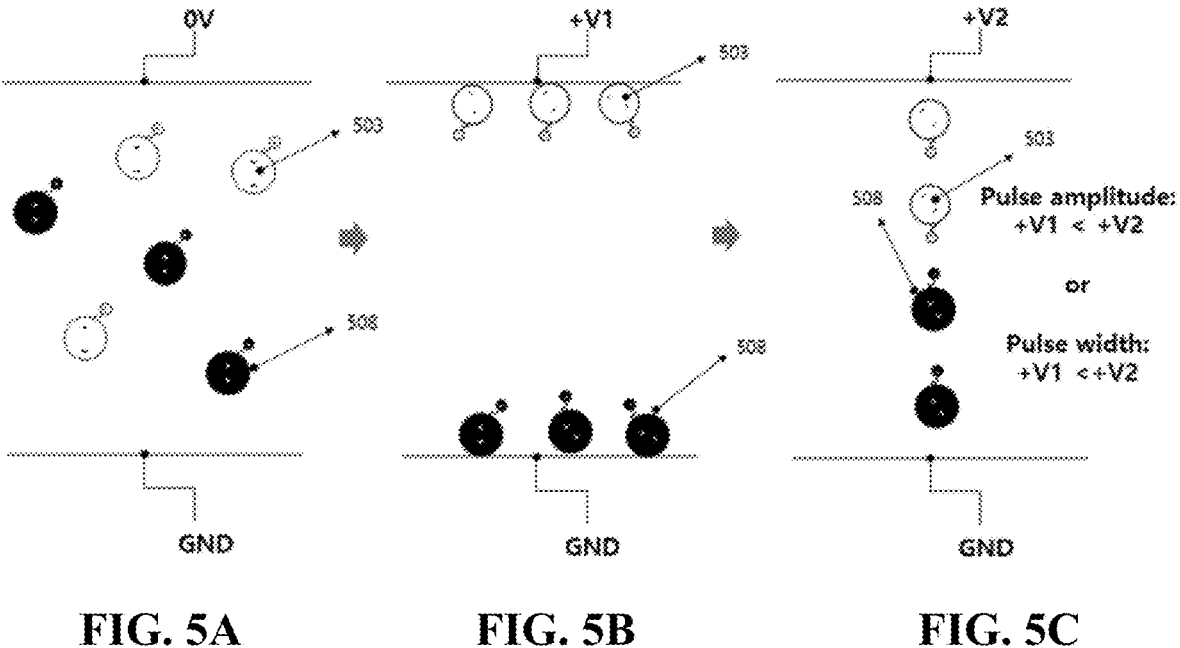
FIG. 5A          FIG. 5B          FIG. 5C

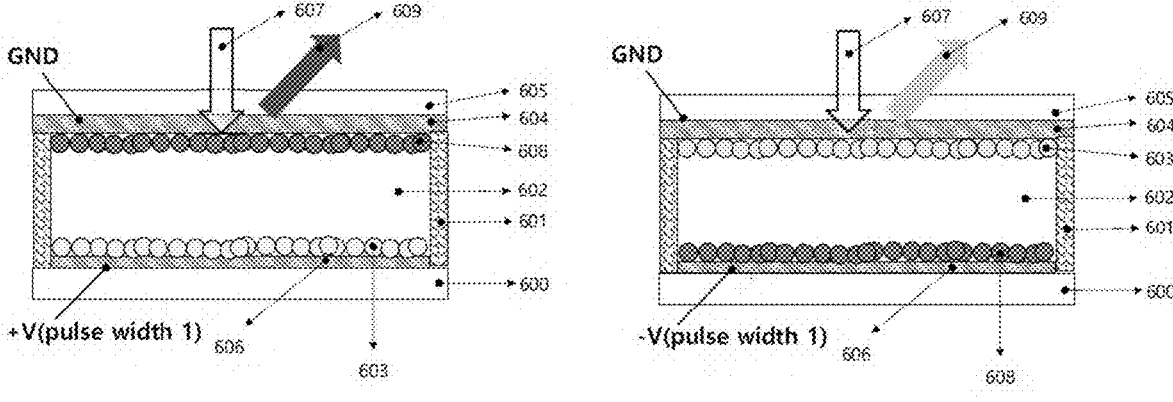
FIG. 6A                                              FIG. 6B
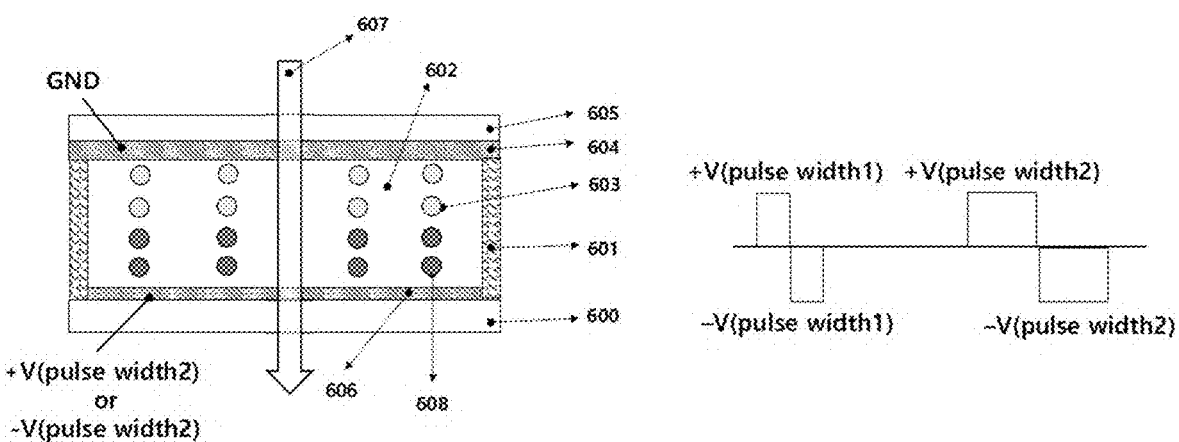
FIG. 6C                                              FIG. 6D

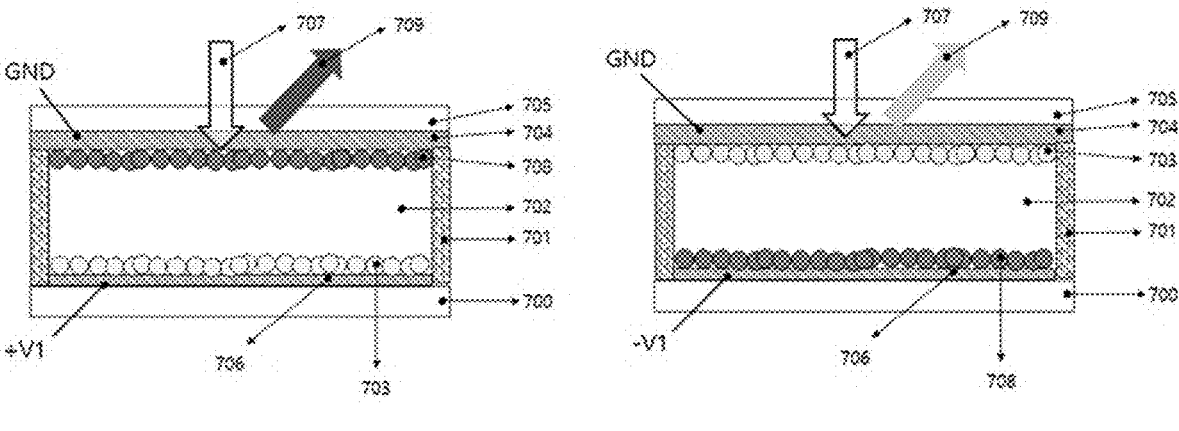
FIG. 7A                    FIG. 7B
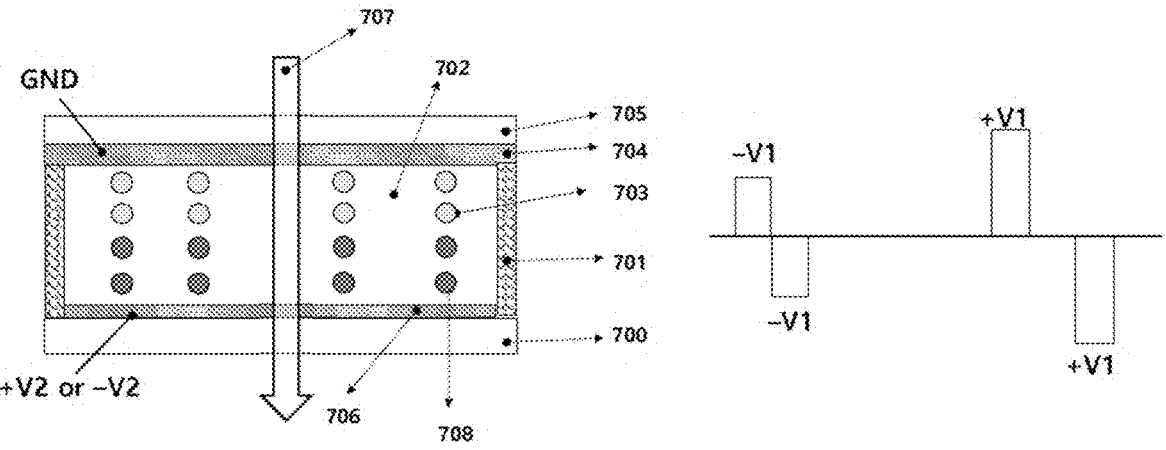
FIG. 7C                    FIG. 7D

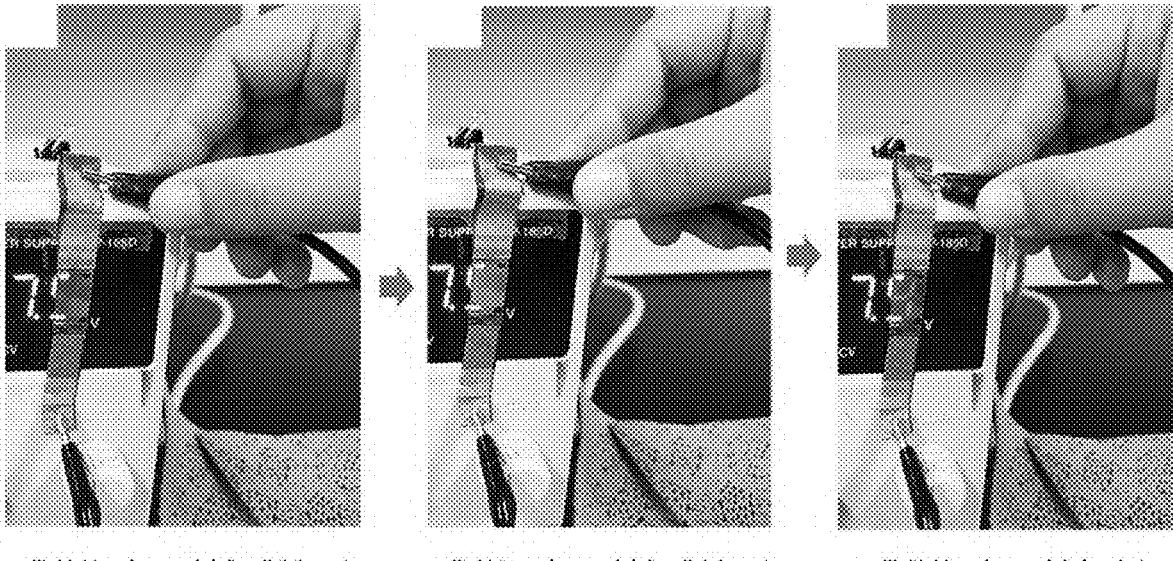
-7.9V(pulse width: 500ms)    +7.9V(pulse width: 500ms)    +7.9V(pulse width: 2s)
FIG. 8A          FIG. 8B          FIG. 8C

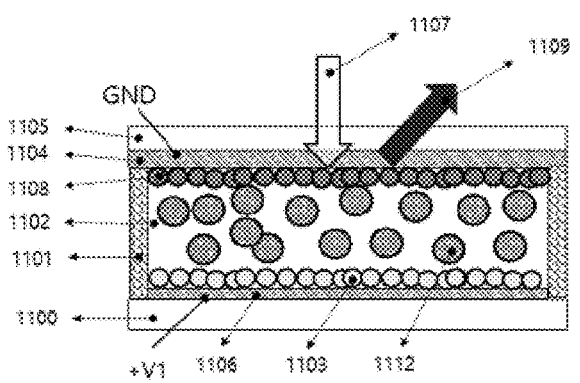
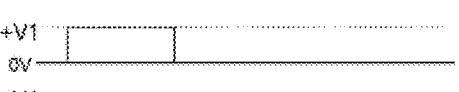
*charge amount: first particle (-), second particle(+) > third particle
*permittivity: first particle, second particle > third particle
FIG. 11A
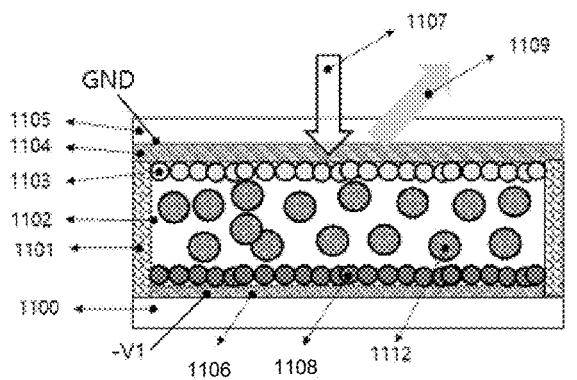
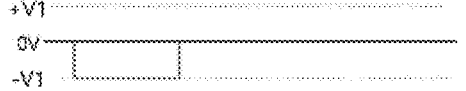
FIG. 11B
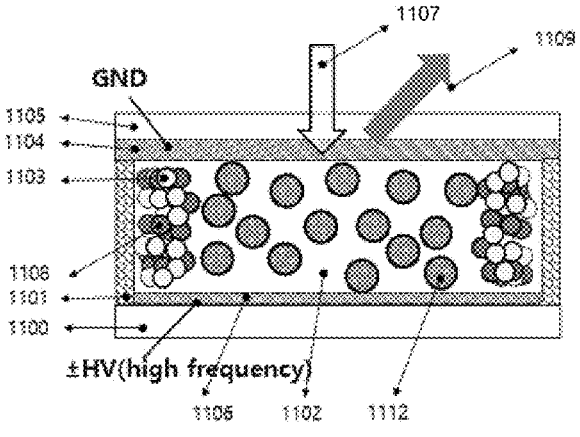
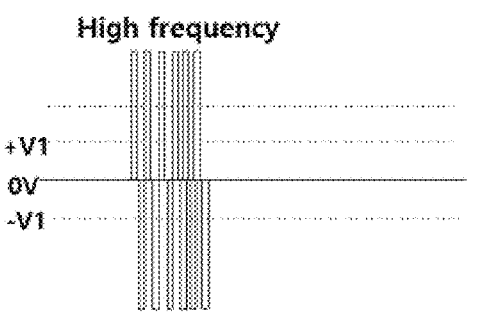
FIG. 11C

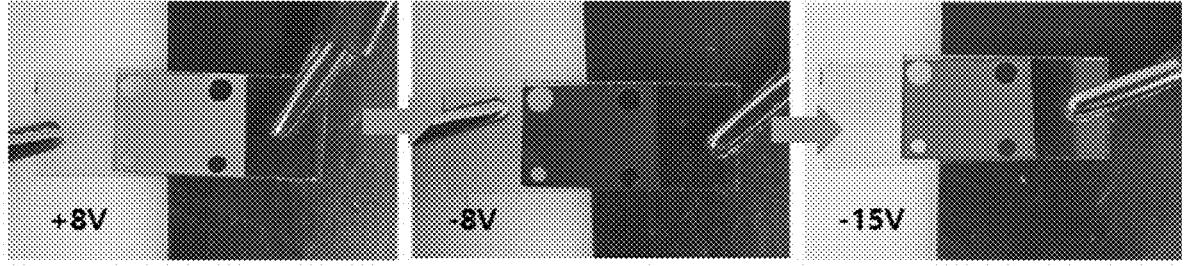
FIG. 14A          FIG. 14B          FIG. 14C
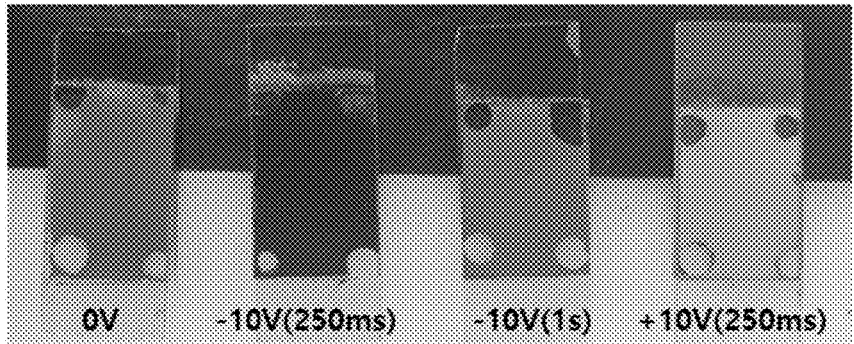
FIG. 14D

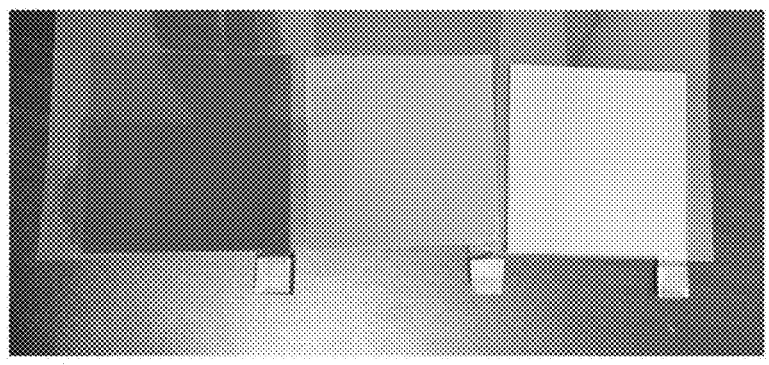
FIG. 16A
FIG. 16B
FIG. 16C
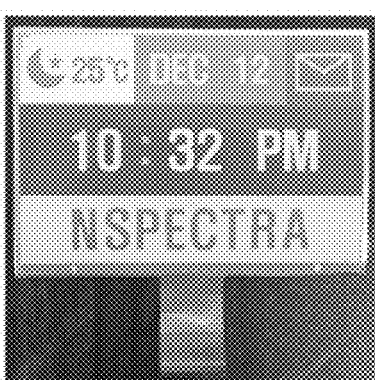
FIG. 16D

DISPLAY PANEL STRUCTURE AND DRIVING METHOD THEREFOR

TECHNICAL FIELD

The present disclosure relates to a display panel structure consisting of a composite material phase and capable of selectively reflecting, shielding, and transmitting a light beam incident from outside and implementing four full colors by using the structure of particles and electrical behavioral characteristics depending on the charge of the particles, and relates to a driving method therefor.

BACKGROUND ART

FIGS. 1A and 1B are sectional views illustrating a panel structure of a conventional display with variable transmittance, illustrating a shielding mode A and a transmission mode B, respectively.

As illustrated in FIGS. 1A and 1B, a representative example to which a conventional display panel with variable transmittance is applied has a panel structure in which a unit cell or sub-cell having at least two electrodes 104 and 106 asymmetrically patterned on an upper substrate 105 and a lower substrate 100 to apply an electric field is filled with ink in which fine particles 103 having a positive or negative charge are dispersed in a transparent fluid 102.

When an electric field is generated by a voltage applied from outside to the two electrodes 104 and 106 in the unit cell or sub-cell illustrated in FIGS. 1A and 1B, electrophoresis occurs in which the particles 103 move in the direction in which a voltage of a polarity opposite to that of the charge of the particles 103 is applied. In this case, when the particles 103 are positioned on the upper electrode 104 having a relatively wide area, as illustrated in FIG. 1A, a light beam 107 incident from outside is absorbed and shielded by the particles 103. On the other hand, when the particles 103 are positioned on the electrode 106 patterned in a relatively narrow area, as illustrated in FIG. 1(b), a light beam incident from outside is transmitted through the region excluding the region where the particles 103 are concentrated.

The panel structure illustrated in FIGS. 1A and 1B enables simple information display when selectively controlling on/off of sub-cells, but is limited in displaying clear and complex images or information because the contrast ratio between a shielded state and a transmitted state is not large and the tonal range is not wide.

FIGS. 2A and 2B are sectional views illustrating a conventional display panel structure capable of implementing a shielding mode, a reflection mode, and a transmission mode. FIGS. 2A, 2B, 2C, and 2D are views illustrating the structure and driving method of the panel in which at least three electrodes 204 and 206 are patterned within a unit cell or sub-cell, the panel being capable of performing all the shielding mode, reflection mode, and transmission mode functions using particles 203 and 208 that have different colors, are charged with opposite polarities, and are dispersed in a transparent fluid 202.

In order to perform the shielding mode or absorption mode, as illustrated in FIG. 2A, the particles 203 having a function of absorbing and blocking a light beam 207 incident from outside are positioned on an upper electrode 204. In FIG. 2A, if the direction of an applied electric field is changed, particles 208 charged with opposite polarity are positioned on the upper electrode 204. In this case, a visible light beam of a specific wavelength band in the light beam 207 incident from outside is absorbed and reflected depending on the color that appears on the surface of the particles 208. Thus, as illustrated in FIG. 2B, the function of the reflection mode is performed in a manner that the color of the particles 208 is represented. In addition, referring to FIG. 2D, when the particles 208 are not positioned on the upper substrate 205 and the particles 203 and 208 charged with opposite polarities are positioned only on the two patterned electrodes 206 of a lower substrate 200, respectively, as illustrated in FIG. 2D, the transmission mode is performed in such a manner that the light beam is transmitted through the region excluding the two electrodes 206 patterned on the lower substrate 200. However, as illustrated in FIG. 2C, in order to implement the transmission mode, a process is necessary to position the two types of particles charged with opposite polarities on the upper electrode 204 and then sequentially move the two types of particles to the two electrodes 206 of the lower substrate 200. This takes a lot of time to update images or information and requires a very complicated driving method. In addition, when the transmission mode according to FIGS. 2C and 2D is performed, the area occupied by the electrode 206 patterned on the lower substrate 200 is wide compared to the panel structure illustrated in FIGS. 1A and 1B, resulting in a problem of relatively low transmittance.

In such conventional techniques illustrated in FIGS. 1A-1B and 2A-2D, in order to set a wide width of variable transmittance and to improve transmittance, it is necessary to narrow the width of the patterned electrodes. As the width of the electrodes decreases, a driving voltage increases with the increase of resistance. The increased applied voltage causes heat generation and short circuit of the electrodes, so there is a limit in patterning the electrodes.

FIGS. 3A, 3B, 3C, and 3D are sectional views illustrating the structure of a conventional display panel capable of implementing a shielding mode, a reflection mode, and a transmission mode using a dielectrophoretic property of particles and fluids. FIGS. 3A, 3B, 3C, and 3D are views illustrate the structure and driving method of a display panel using a dielectrophoresis phenomenon in which when a dipole is suspended in a non-uniform electric field, the dipole is attracted in the direction in which the electric field is strong. The display panel illustrated in FIGS. 3A, 3B, 3C, and 3D uses particles that have different colors and of which at least one type is charged with a negative polarity or a positive polarity, and has a panel structure in which a unit cell or sub-cell is filled with a transparent fluid in which the particles different in permittivity from the transparent fluid are dispersed. In this case, the electrode structure of the unit cell or sub-cell is different from the electrode structure illustrated in FIGS. 2A-2D in that it is not necessary to asymmetrically pattern two electrodes of upper and lower substrates in the unit cell or sub-cell. In such a conventional technique illustrated in FIGS. 3A, 3B, 3C, and 3D, when a sufficient voltage (threshold voltage) for the particles to undergo electrophoresis is applied from outside and an electric field is generated thereby, as illustrated in FIGS. 3A and 3B, the charged particles 303 and 308 move to an upper electrode 304 or a lower electrode 306 to which a voltage of a polarity opposite to that of the particles is applied. Thus, the function of a shielding mode (or absorption mode) and a reflection mode are performed depending on the color of the particles positioned on the upper electrode 304. In other words, the shielding mode is performed in such a manner that a light beam 307 incident from outside is absorbed or reflected (see the arrow 309), and the reflection mode is performed in such a manner that a visible light beam of a specific wavelength band is absorbed or reflected depending on the color of the particles. If a high voltage higher than the threshold voltage at which particles undergo electrophoresis is applied at a high frequency, the particles move irregularly due to dielectrophoresis caused under application of a non-uniform electric field and are gradually positioned to the edge of the unit cell or sub-cell, so that a transmission mode is performed in such a manner that the light beam incident from outside is transmitted through the region excluding the region where the particles are aggregated in the unit cell or sub-cell. However, the particles or transparent fluid with high permittivity used to maximize the dielectrophoresis phenomenon and the high voltage and high frequency applied to the panel cause a large amount of current consumed by the panel during driving, and friction and impact between the particles accelerate a reduction in lifespan of the particles.

In addition, in order to perform the shielding mode and reflection mode again using the particles that are positioned and agglomerated at the edge of the unit cell or sub-cell under application of the high voltage and high frequency, a process is necessary to age the particles with a driving voltage higher than the threshold voltage and electrically disperse the particles again in the fluid. This causes a reduction in lifespan of the particles and problems of reliability and reproducibility of electrical/optical properties.

In addition, it takes a relatively long time to update an image or information according to a complicated driving method due to the driving characteristics in which voltage application has to be performed by combining the difference in applied voltage, the difference between low and high frequencies, and the like. Also, power consumption increases in a driving unit such as a driving board, as well as in the panel. In addition, a high-performance driving chip is required to generate and control a complex driving waveform as illustrated in FIG. 3D, causing an increase in manufacturing costs.

FIG. 3E is a sectional view illustrating the structure of a transparent display panel with variable transmittance by using the electrorheological property of particles. Referring to FIG. 3E, when an electric field is generated, particles 302 exhibit a transmission mode by chain formation due to an electric polarization phenomenon. The electrorheological property is the property that results from electric polarization of charged or neutral particles. When an electric field is generated by applying a voltage between two electrodes, positively charged protons are aligned in the direction of a negative electrode and negatively charged electrons are aligned in the direction of a positive electrode. This phenomenon is called polarization. When an electric field is generated, as illustrated in FIG. 3E, when many polarized particles exist in an electrorheological fluid and the particles have a spherical shape, the following process proceeds. First, at the moment of generating the electric field, positive charges are arranged on the top of each particle and negative charges are arranged on the bottom of the particle. In this case, two different particles exhibit completely different movements depending on the angle at which the particles approach each other. If one particle approaches the bottom of the other particle and is arranged nearly perpendicular to the direction of dipole, a positive pole of one particle and meet a negative pole of the other particle, so that the two particles have an attractive force therebetween. In contrast, if one particle is arranged side by side next to the other particle, a lower negative pole and the upper positive pole of one particle are arranged side by side with the negative pole and a positive pole of the other particle, so that the two particles have a repulsive force therebetween. The attractive force or repulsive force is determined depending on the angle at which the particles approach each other. The polarized particles moving by the attractive force and repulsive force gradually approach each other by the attractive force, resulting in the formation of a particle chain connected from one end to the other end of an electrode plate. After several single chains are formed in this manner, a single chain moves toward and connects to another adjacent chain to form a thick column. This process is repeated to form a thicker column. This phenomenon is called aggregation of particles.

The formation of chains caused by aggregation or electric polarization of charged particles in an electric field results from a dipole-dipole interaction of particles having a dipole moment.

Because the particles 302 illustrated in FIG. 3E become polarized only under application of the electric field, and when becoming polarized, form a chain structure without being biased toward the top or bottom of the electrodes, the particles 302 cannot exhibit an electrophoretic behavior of moving to the upper or lower electrode depending on the direction of the electric field. In particular, in order to lower power consumption and improve lifespan of an electrophoretic display, bistability is necessary to adjust the viscosity of the fluid to maintain the final position of moved particles even when the voltage is cut off. However, when bistability is provided, the polarized particles are electrically dispersed in the fluid back to their pre-drive state or are difficult to move to the upper or lower electrode, so that it is impossible to implement the shielding mode for blocking the light beam incident from outside.

Even if bistability is not provided, the time for implementing the shielding mode is not constant. Also, it is difficult to electrically control the dispersed state of the particles, so the shielding rate is not constant. In addition, due to the polarized particles that start to become polarized from the moment they are exposed to the electric field, the response time for driving and the driving voltage are increased compared to physically positively and negatively charged particles that are applied to the present disclosure.

DISCLOSURE

Technical Problem

Accordingly, the present disclosure has been made keeping in mind the above problems occurring in the related art, and an objective of the present disclosure is to provide a display panel structure consisting of a composite material phase and capable of at least two colors, at least three colors, or four full colors and a driving method therefor, in which a plurality of particles, which have a structure in which one particle has both a positive charge and a negative charge, have different colors, and have different charge amounts, are dispersed in a transparent fluid and filled in a panel with an unpatterned electrode within a unit cell or sub-cell, so that it is possible to implement a shielding mode, a reflection mode, and a transmission mode stably and reproducibly without requiring a complicated driving method, and to enable a reduction of manufacturing costs, improvement of transmittance, improvement of image or information update time, and improvement of characteristics such as driving voltage and lifespan.

Another objective of the present disclosure is to provide a display panel structure consisting of a composite material phase and capable of implementing four full colors and a transmission mode conversion, and to provide a driving method therefor.

Another objective of the present disclosure is to provide a display panel structure capable of implementing at least two colors, at least three colors, or four full colors on a front side of a unit cell without requiring the use of a color filter and performing a transmission mode function, and to provide a driving method therefor.

Objectives of the present disclosure are not limited to the objectives mentioned above, and other objectives not mentioned will be clearly understood by those skilled in the art from the following description.

Technical Solution

An embodiment of the present disclosure provides a display panel structure consisting of a composite material phase and capable of implementing at least two colors. The display panel structure may include: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region may include a plurality of first particles and a plurality of second particles having a color different from that of the plurality of first particles, the first and second particles being dispersed in a fluid. Each of the pluralities of first and second particles may have a structure in which one particle has both a positive charge and a negative charge, the positive and negative charges may have different charge amounts from each other, and the pluralities of first and second particles may be vertically and horizontally arranged at regular intervals from the upper electrode to the lower electrode so as to implement a transmission mode.

An embodiment of the present disclosure provides a display panel structure consisting of a composite material phase and capable of implementing at least two colors. The display panel structure may include: an upper substrate; a lower substrate; an upper electrode disposed on a surface of the upper substrate; a lower electrode disposed on a surface of the lower substrate; and a binder layer including a plurality of microcapsules formed between the upper electrode and the lower electrode. Each of the plurality of microcapsules may include a plurality of first particles and a plurality of second particles having a color different from that of the plurality of first particles, the first and second particles being dispersed in a fluid. Each of the pluralities of first and second particles may have a structure in which one particle has both a positive charge and a negative charge, the positive and negative charges may have different charge amounts from each other, and the pluralities of first and second particles may be vertically and horizontally arranged at regular intervals from the upper electrode to the lower electrode so as to implement a transmission mode.

Each of the pluralities of first and second particles may have a particle structure having a core-shell structure, and the shell partially coated on a surface of the core and the core may have charges of opposite polarities.

The core of the first particle and the core of the second particle may have charges of opposite polarities, and the shell of the first particle and the shell of the second particle may have charges of opposite polarities.

Cationic and anionic ligands of a predetermined ratio may be bound to a surface of a polymer particle having a functional group or a metal or a metal compound so that the amount of the positive charge of each of the pluralities of first and second particles has a predetermined ratio relative to the amount of the negative charge.

In order to control mode conversion of the display panel structure consisting of a composite material phase and capable of implementing at least two colors according to the embodiment of the present disclosure, the lower electrode may be patterned for each unit cell on the lower substrate, and a reflection mode, the transmission mode, or a shielding mode may be implemented by selectively controlling an application time of a driving voltage, an intensity of the driving voltage, a pulse amplitude, or a pulse width for the each unit cell.

In order to control mode conversion of the display panel structure consisting of a composite material phase and capable of implementing at least two colors according to the embodiment of the present disclosure, the lower electrode may be patterned for each unit cell on the lower substrate, and a reflection mode, the transmission mode, or a shielding mode may be implemented by selectively controlling an intensity of a driving voltage or a pulse amplitude for the each unit cell.

In order to control mode conversion of the display panel structure consisting of a composite material phase and capable of implementing at least two colors according to the embodiment of the present disclosure, the lower electrode may be patterned for each at least one unit microcapsule on the lower substrate, and a reflection mode, the transmission mode, or a shielding mode may be implemented by selectively controlling an application time of a driving voltage or an intensity of the driving voltage for the each unit microcapsule.

An embodiment of the present disclosure provides a display panel structure consisting of a composite material phase and capable of implementing at least three colors. The display panel structure may include: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region may include a plurality of first particles exhibiting a first color, a plurality of second particles exhibiting a second color, and a plurality of third particles exhibiting a third color, the first, second, and third particles being dispersed in a fluid. Each of the pluralities of first and second particles may have a structure in which one particle has both a positive charge and a negative charge, the positive and negative charges may have different charge amounts from each other, and the pluralities of first and second particles may be vertically and horizontally arranged at regular intervals from the upper electrode to the lower electrode so as to implement a transmission mode.

An embodiment of the present disclosure provides a display panel structure consisting of a composite material phase and capable of implementing at least three colors. The display panel structure may include: an upper substrate; a lower substrate; an upper electrode disposed on a surface of the upper substrate; a lower electrode disposed on a surface of the lower substrate; and a binder layer including a plurality of microcapsules formed between the upper electrode and the lower electrode. Each of the plurality of microcapsules may include a plurality of first particles exhibiting a first color, a plurality of second particles exhibiting a second color, and a plurality of third particles exhibiting a third color, the first, second, and third particles being dispersed in a fluid. Each of the pluralities of first and second particles may have a structure in which one particle has both a positive charge and a negative charge, the positive and negative charges may have different charge amounts from each other, and the pluralities of first and second particles may be vertically and horizontally arranged at regular intervals from the upper electrode to the lower electrode so as to implement a transmission mode.

Each of the pluralities of first and second particles may have a particle structure having a core-shell structure, and the shell partially coated on a surface of the core and the core may have charges of opposite polarities.

The core of the first particle and the core of the second particle may have charges of opposite polarities, and the shell of the first particle and the shell of the second particle may have charges of opposite polarities.

Cationic and anionic ligands of a predetermined ratio may be bound to a surface of a polymer particle having a functional group or a metal or a metal compound so that the amount of the positive charge of each of the pluralities of first and second particles has a predetermined ratio relative to the amount of the negative charge.

The plurality of third particles exhibiting the third color may have no charge or have a lower charge amount than that of the first and second particles but have a single polarity.

An embodiment of the present disclosure provides a display panel structure consisting of a composite material phase and capable of implementing at least three colors and a transmission mode conversion. The display panel structure may include: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region may include a plurality of first particles exhibiting a first color, a plurality of second particles exhibiting a second color, and a plurality of third particles exhibiting a third color, the first, second, and third particles being dispersed in a fluid. Each of the pluralities of first, second, and third particles may have a structure in which one particle has both a positive charge and a negative charge, the positive and negative charges may have different charge amounts from each other, and the pluralities of first, second, and third particles may be vertically and horizontally arranged at regular intervals from the upper electrode to the lower electrode so as to implement the transmission mode.

An embodiment of the present disclosure provides a display panel structure consisting of a composite material phase and capable of implementing at least three colors and a transmission mode conversion. The display panel structure may include: an upper substrate; a lower substrate; an upper electrode disposed on a surface of the upper substrate; a lower electrode disposed on a surface of the lower substrate; and a binder layer including a plurality of microcapsules formed between the upper electrode and the lower electrode. Each of the plurality of microcapsules may include a plurality of first particles exhibiting a first color, a plurality of second particles exhibiting a second color, and a plurality of third particles exhibiting a third color, the first, second, and third particles being dispersed in a fluid. Each of the pluralities of first, second, and third particles may have a structure in which one particle has both a positive charge and a negative charge, the positive and negative charges may have different charge amounts from each other, and the pluralities of first, second, and third particles may be vertically and horizontally arranged at regular intervals from the upper electrode to the lower electrode so as to implement the transmission mode.

Each of the pluralities of first, second, and third particles may have a particle structure having a core-shell structure, and the shell partially coated on a surface of the core and the core may have charges of opposite polarities.

The charge amount of the core and the shell of each of the pluralities of first and second particles may be larger than that of the core and the shell of each of the plurality of third particles.

Cationic and anionic ligands of a predetermined ratio may be bound to a surface of a polymer particle having a functional group or a metal or a metal compound so that the amount of the positive charge of each of the pluralities of first, second, third particles has a predetermined ratio relative to the amount of the negative charge.

In order to control mode conversion of the display panel structure consisting of a composite material phase and capable of implementing at least three colors according to the embodiment of the present disclosure, the lower electrode may be patterned for each unit cell on the lower substrate, and a reflection mode, the transmission mode, or a shielding mode may be implemented by selectively controlling an application time of a driving voltage or an intensity of the driving voltage for the each unit cell.

In order to control mode conversion of the display panel structure consisting of a composite material phase and capable of implementing at least three colors according to the embodiment of the present disclosure, the lower electrode may be patterned for each at least one unit microcapsule on the lower substrate, and a reflection mode, the transmission mode, or a shielding mode may be implemented by selectively controlling an application time of a driving voltage or an intensity of the driving voltage for the each unit microcapsule.

An embodiment of the present disclosure provides a display panel structure consisting of a composite material phase and capable of implementing four full colors. The display panel structure may include: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region may include a plurality of first particles exhibiting a first color, a plurality of second particles exhibiting a second color, a plurality of third particles exhibiting a third color, and a plurality of fourth particles exhibiting a fourth color, the first, second, third, and fourth particles being dispersed in a fluid. Each of the pluralities of first and second particles may have a structure in which one particle has both a positive charge and a negative charge, the positive and negative charges may have different charge amounts from each other, and the pluralities of first and second particles may be vertically and horizontally arranged at regular intervals from the upper electrode to the lower electrode so as to implement four full colors.

An embodiment of the present disclosure provides a display panel structure consisting of a composite material phase and capable of implementing four full colors. The display panel structure may include: an upper substrate; a lower substrate; an upper electrode disposed on a surface of the upper substrate; a lower electrode disposed on a surface of the lower substrate; and a binder layer including a plurality of microcapsules formed between the upper electrode and the lower electrode. Each of the plurality of microcapsules may include a plurality of first particles exhibiting a first color, a plurality of second particles exhibiting a second color, a plurality of third particles exhibiting a third color, and a plurality of fourth particles, the first, second, third, and fourth particles being dispersed in a fluid. Each of the pluralities of first and second particles has a structure in which one particle may have both a positive charge and a negative charge, the positive and negative charges may have different charge amounts from each other, and the pluralities of first and second particles may be vertically and horizontally arranged at regular intervals from the upper electrode to the lower electrode so as to implement four full colors.

Each of the pluralities of first and second particles may have a particle structure having a core-shell structure, and the shell partially coated on a surface of the core and the core may have charges of opposite polarities.

The core of the first particle and the core of the second particle may have charges of opposite polarities, and the shell of the first particle and the shell of the second particle may have charges of opposite polarities.

Cationic and anionic ligands of a predetermined ratio may be bound to a surface of a polymer particle having a functional group or a metal or a metal compound so that the amount of the positive charge of each of the pluralities of first and second particles has a predetermined ratio relative to the amount of the negative charge.

Each of plurality of third particles exhibiting the third color and the plurality of fourth particles exhibiting the fourth color may have a structure in which one particle has one of a positive charge and a negative charge.

In order to control mode conversion of the display panel structure consisting of a composite material phase and capable of implementing four full colors according to the embodiment of the present disclosure, the lower electrode may be patterned for each unit cell on the lower substrate, and a reflection mode, the transmission mode, or a shielding mode may be implemented by selectively controlling an application time of a driving voltage or an intensity of the driving voltage for the each unit cell.

In order to control mode conversion of the display panel structure consisting of a composite material phase and capable of implementing four full colors according to the embodiment of the present disclosure, the lower electrode may be patterned for each at least one unit microcapsule on the lower substrate, and a reflection mode, the transmission mode, or a shielding mode may be implemented by selectively controlling an application time of a driving voltage or an intensity of the driving voltage for the each unit microcapsule.

The charge amount of the first and second particles may be larger than that of the third and fourth particles, and the first and second particles may have the same driving voltage and may have a relatively lower threshold voltage than that of the third and fourth particles.

An embodiment of the present disclosure provides a display panel structure consisting of a composite material phase and capable of implementing four full colors and a transmission mode conversion. The display panel structure may include: an upper substrate; a lower substrate; an upper electrode disposed on a surface of the upper substrate; a lower electrode disposed on a surface of the lower substrate; and a partition wall defining a unit cell region formed between the upper substrate and the lower substrate. The unit cell region may include a plurality of first particles exhibiting a first color, a plurality of second particles exhibiting a second color, a plurality of third particles exhibiting a third color, and a plurality of fourth particles exhibiting a fourth color, the first, second, third, and fourth particles being dispersed in a fluid. Each of the pluralities of first, second, third, and fourth particles may have a structure in which one particle has both a positive charge and a negative charge, the positive and negative charges may have different charge amounts from each other, and the pluralities of first, second, third, and fourth particles may be vertically and horizontally arranged at regular intervals from the upper electrode to the lower electrode so as to implement the transmission mode.

An embodiment of the present disclosure provides a display panel structure consisting of a composite material phase and capable of implementing four full colors and a transmission mode conversion. The display panel structure may include: an upper substrate; a lower substrate; an upper electrode disposed on a surface of the upper substrate; a lower electrode disposed on a surface of the lower substrate; and a binder layer including a plurality of microcapsules formed between the upper electrode and the lower electrode. Each of the plurality of microcapsules may include a plurality of first particles exhibiting a first color, a plurality of second particles exhibiting a second color, a plurality of third particles exhibiting a third color, and a plurality of fourth particles exhibiting a fourth color the first, second, third, and fourth particles being dispersed in a fluid. Each of the pluralities of first, second, third, and fourth particles may have a structure in which one particle has both a positive charge and a negative charge, the positive and negative charges may have different charge amounts from each other, and the pluralities of first, second, third, and fourth particles may be vertically and horizontally arranged at regular intervals from the upper electrode to the lower electrode so as to implement the transmission mode.

Each of the pluralities of first, second, third, and fourth particles may have a particle structure having a core-shell structure, and the shell partially coated on a surface of the core and the core may have charges of opposite polarities.

The charge amount of the core and the shell of each of the pluralities of first and second particles may be larger than that of the core and the shell of each of the plurality of third and fourth particles.

Cationic and anionic ligands of a predetermined ratio may be bound to a surface of a polymer particle having a functional group or a metal or a metal compound so that the amount of the positive charge of each of the pluralities of first, second, third, and fourth particles has a predetermined ratio relative to the amount of the negative charge.

In order to control mode conversion of the display panel structure consisting of a composite material phase and capable of implementing four full colors according to the embodiment of the present disclosure, the lower electrode may be patterned for each unit cell on the lower substrate, and a reflection mode, the transmission mode, or a shielding mode may be implemented by selectively controlling an application time of a driving voltage or an intensity of the driving voltage for the each unit cell.

In order to control mode conversion of the display panel structure consisting of a composite material phase and capable of implementing four full colors according to the embodiment of the present disclosure, the lower electrode may be patterned for each at least one unit microcapsule on the lower substrate, and a reflection mode, the transmission mode, or a shielding mode may be implemented by selectively controlling an application time of a driving voltage or an intensity of the driving voltage for the each unit microcapsule.

The first and second particles may have a lower threshold voltage than that of the third and fourth particles, and a driving voltage for allowing the third and fourth particles to be vertically arranged between the upper and lower electrodes may be higher than the driving voltage of the first and second particles.

Advantageous Effects

According to a display panel structure consisting of a composite material phase and a driving method therefor according to the present disclosure, it is possible to implement two colors, three colors, or four full colors, and implement a transmission mode conversion.

According to the display panel structure and the driving method therefor according to the present disclosure, a shielding mode, a reflection mode, and a transmission mode can all be implemented, and patterning of microelectrodes in a unit cell or sub-cell is not required so that an electric field is concentrated in a specific region during the implementation of the transmission mode. Further, a panel can be manufactured using microencapsulation, and thus it is possible to improve transmittance without an increase in driving voltage and lead resistance, simplify a manufacturing process, and reduce manufacturing costs.

According to the display panel structure and the driving method therefor according to the present disclosure, the shielding mode, the reflection mode, and the transmission mode can be controlled stably and reproducibly without application of high voltage at high frequency and without a complex driving waveform, and thus the use of a high-spec driving chip is not required. Further, it is possible to lower the power consumed in a driving board and reduce manufacturing costs.

According to the display panel structure and the driving method therefor according to the present disclosure, one particle has both a positive charge and a negative charge even in the absence of an electric field, and thus application of a high voltage/high frequency for polarization of particles is not required. Further, it is possible to shorten the update time of images or information without a reduction in lifespan of the particles by simplifying the process for conversion to the transmission mode, and expand the variable width of transmittance and the tonal range that can be implemented.

According to the display panel structure and the driving method therefor according to the present disclosure, the use of a color filter that degrades optical properties is not required in implementing at least two colors, at least three colors, or full four colors, and it is not necessary to independently inject particles of different colors into a sub-cell.

According to the display panel structure and the driving method therefor according to the present disclosure, a panel can be manufactured using microencapsulation, and thus it is possible to simplify a manufacturing process, reduce manufacturing costs, and implement various colors by improving color reproducibility without a degradation of optical properties.

According to the display panel structure and the driving method therefor according to the present disclosure, the display panel structure consists of a composite material phase, and full color can be implemented using four types of color particles.

According to the display panel structure and the driving method therefor according to the present disclosure, the use of a color filter that degrades optical properties is not required in implementing colors, and it is not necessary to independently inject particles of different colors into a sub-cell. Further, a panel can be manufactured using microencapsulation, and thus it is possible to simplify a manufacturing process, reduce manufacturing costs, and improve color reproducibility without a degradation of optical properties.

According to the display panel structure and the driving method therefor according to the present disclosure, a shielding mode function can also be performed using various colors. Further, compared to the related art, complex and precise images or information can be displayed, and thus the application range of the present disclosure is very wide.

DESCRIPTION OF DRAWINGS

FIGS. 2A, 2B, 2C, and 2D are sectional views illustrating a conventional display panel structure capable of implementing a shielding mode, a reflection mode, and a transmission mode.

FIGS. 3A, 3B, 3C, 3D, and 3E are sectional views illustrating the structure of a conventional display panel capable of implementing a shielding mode, a reflection mode, and a transmission mode using a dielectrophoretic property of particles and fluids.

FIGS. 5A, 5B, and 5C are sectional views illustrating a display panel structure including two types of color particles, according to an embodiment of the present disclosure.

FIGS. 6A, 6B, 6C, and 6D are sectional views illustrating a display panel structure including two types of color particles and implementing a shielding mode, a reflection mode, and a transmission mode, according to an embodiment of the present disclosure.

FIGS. 7A, 7B, 7C, and 7D are sectional views illustrating a display panel structure including two types of color particles and implementing a shielding mode, a reflection mode, and a transmission mode, according to an embodiment of the present disclosure.

FIGS. 8A, 8B, and 8C are images demonstrating the shielding mode (FIG. 8A), the reflection mode (FIG. 8B), and the transmission mode (FIG. 8C) using a display panel film manufactured according to the embodiment of FIGS. 6A, 6B, 6C, and 6D.

FIGS. 11A, 11B, and 11C are sectional views illustrating a reflective display panel structure capable of implementing three colors and a driving method therefor, according to an embodiment of the present disclosure.

FIGS. 14A, 14B, 14C, and 14D are images demonstrating three colors as the experimental results of driving a reflective color display panel film manufactured according to FIG. 13 using three types of particles.

FIGS. 16A-16D is an image illustrating a microcapsule-type film and a display panel on which three colors are implemented, according to an embodiment of the present disclosure.

MODE FOR INVENTION

Figure 1A:
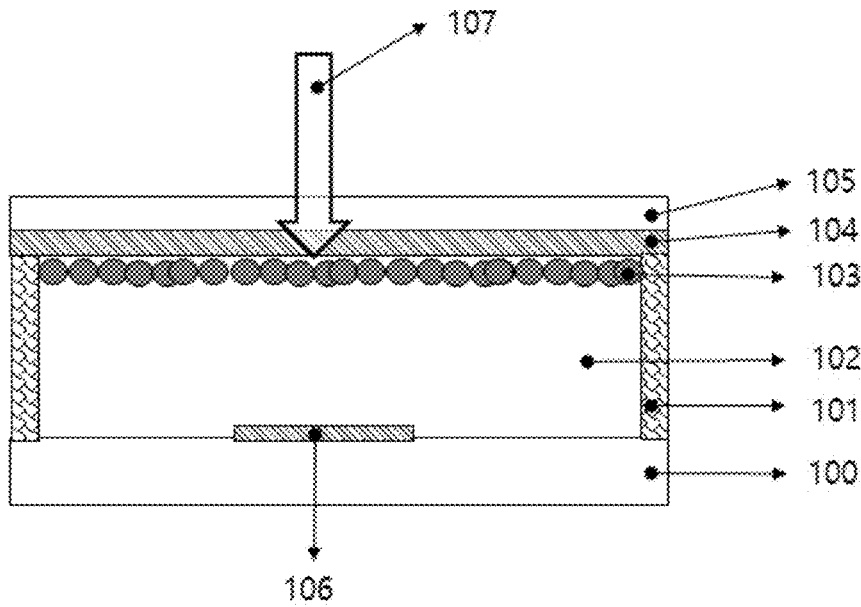
FIGS. 1A and 1B are sectional views illustrating a display panel structure of a conventional display with variable transmittance, illustrating a shielding mode A and a transmission mode B, respectively.

The present disclosure may have various variations, and exemplary embodiments, and particular exemplary embodiments will be exemplified through drawings and explained in detail in the detailed description of the present disclosure. The effects and features of the present disclosure and the accomplishing method thereof will become apparent from the following description of the embodiments, taken in conjunction with the accompanying drawings. The present disclosure may, however, be embodied in many different forms and should not be construed as being limited to the embodiments set forth herein.

Hereinafter, embodiments of the present disclosure will be described in detail with reference to the accompanying drawings. The same reference numerals will be used throughout the drawings and the description to refer to the same or like elements or parts.

In the following embodiments, the terms "first", "second", etc. are only used to distinguish one element from another. Further, the singular forms are intended to include the plural forms as well, unless the context clearly indicates otherwise.

In the following embodiments, the terms "comprise", "include", "have", etc. specify the presence of stated features or elements but do not preclude the presence or addition of one or more other features or elements.

Figure 4A:
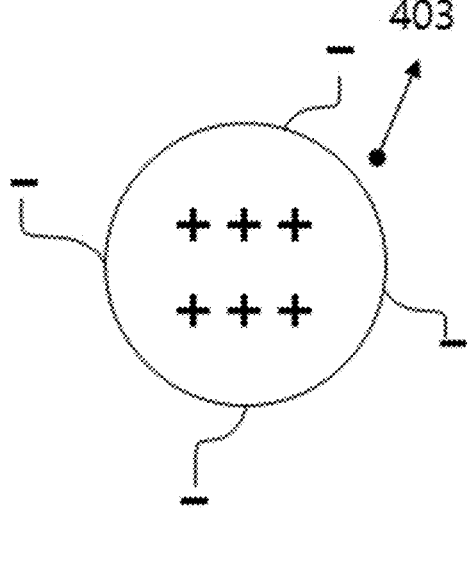
FIGS. 4A and 4B are schematic views illustrating the structure of a particle according to an embodiment of the present disclosure, illustrating a cross-section of the particle.
Figure 4B:
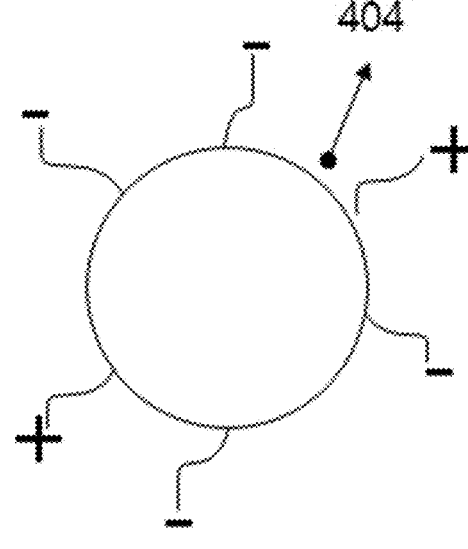

FIGS. 4A and 4B are schematic views illustrating the structure of a particle according to an embodiment of the present disclosure, illustrating a cross-section of the particle.

Referring to FIGS. 4A and 4B, unlike a particle structure in which electric polarization of particles occurs only under application of an electric field, the particle according to the present disclosure has a structure a structure that maintains a state in which each of particles 403 and 404 has both positive and negative charges even under no application of an electric field.

In this case, it is characterized in that positive and negative charges of each of the particles 403 and 404 are set to be different from each other in charge amount.

Referring to FIG. 4A, in a method of forming one particle 403 to have both positive and negative charges, a particle structure having a core-shell structure may be used. As illustrated in FIG. 4A, when the particle 403, which serves as a core, is prepared to have a negative charge and then partially coated with a shell material having a positive charge on the surface of the particle 403, the particle 403 may have both the positive and negative charges. On the contrary, the core particle 403 having a positive charge may be partially coated with a shell material having a negative charge.

In another method, as illustrated in FIG. 4B, cationic and anionic ligands of a predetermined ratio may be reacted and bound (ionic bond, covalent bond, or coordinate bond) to the surface of the core particle 404 such as a polymer particle having a functional group or a metal or a metal compound so that the amount the positive charge of the particle 404 has a predetermined ratio relative to the amount of the negative charge.

In this case, the core, shell material, and ligands may be organic, polymeric, inorganic, or metal compounds, and may absorb light or reflect (or scatter) light. In addition, a reflective material such as a metal particle or a color particle may be used, and the particle is not limited in shape, material, and manufacturing method as long as it has a particle structure having both a cation and an anion.

In general, it may be set so that the charge amount in the region having a positive charge in one particle is different from that in the region having a negative charge by controlling the type of core, shell material, and ligands, the coating time of the shell material, the reaction time with the ligands, the ratio (mass ratio, volume ratio, surface area ratio, molar ratio, and the like) of the shell material to be coated or the ligands to the core, an additive in fluid, the type and amount of a charge control agent (which may also be used as a material for the ligands), and the type and amount of a surfactant (which may also be used as a material for the ligands). In other words, the charge amount of the core particle and the charge amount of the material coated on the surface of the core particle may be controlled, or the charge amount of the cationic and anionic ligands on the surface of the core particle may be controlled.

The charge control agent includes at least one of a positive charge control agent and a negative charge control agent. As the positive charge control agent, there may be used an azine-type positive charge control agent, quaternary ammonium salts, and a plasticizer having a positive charge. As the negative charge control agent, there may be used a tert-butyl salicylate-based negative charge control agent (e.g., tert-butyl zinc salicylate, tert-butyl calcium salicylate, and the like), an azo-type negative charge control agent, and a plasticizer having a negative charge.

As the surfactant, there may be used an anionic surfactant, a cationic surfactant, or an amphoteric surfactant. The anionic surfactant includes carboxylic acid (—COOH), sulfuric acid ester (—O·SO₃H), and sulfonic acid (—SO₃H) as a hydrophilic group, and includes an alkyl group or a hydrocarbon group such as an isoalkyl group, a benzene ring, and a naphthalene ring. As the anionic surfactant, there may be used Medialan A, Naphthenic Acid Soap, Rosin, CMC, Emulphor STH, Mersolate, Aerosol, Igepon T, ABS, Nekal A, BX, Gardinol, Turkey red oil, Arctic Syntex, Vel, Igepon B, Gardinol GY, and Tergitol P.

The cationic surfactant includes a hydrophilic group containing a major amount of simple amine salts containing primary to tertiary amines obtained by salt formation and quaternary ammonium salts and containing a very minor amount of an onium compound such as phosphonium salts and sulfonium salts. Of these, the quaternary ammonium salts are the most important, and includes, as five types of N, a compound bonded to a chain alkyl group and a cyclic nitrogen compound, such as pyridinium salts or quinolinium salts, particularly a heterocyclic compound such as imidazolinium salts. As the quaternary ammonium salts, there may be used primary, secondary, tertiary amine salts, Sapamin CH, Aquard, Decamine, Sapamin MS, Benzalkonium chloride, Hyamine, Repellat, Emcol E-607, Zelan A, Velan PF, Isotan Q-16, and Myxal.

The amphoteric surfactant contains —COOH group, —SO3H group, or —OSO3H group as an anion in a molecule. As the amphoteric surfactant, there may be used a soap containing, as a cation, only an amine, particularly a nitrogen group in the form of a quaternary ammonium.

FIGS. 5A, 5B, and 5C are sectional views illustrating a display panel structure, illustrating the electrical behavioral characteristics of particles in a transparent fluid depending on the intensity or application time of an applied voltage, according to an embodiment of the present disclosure, the particles having a structure in which one particle has both a positive charge and a negative charge.

FIGS. 6A, 6B, 6C, and 6D are sectional views illustrating a display panel structure capable of implementing a shielding mode, a reflection mode, and a transmission mode through control of the application time (pulse width) of a driving voltage using the electrical behavioral characteristics of the particles illustrated in FIG. 5, according to an embodiment of the present disclosure.

FIGS. 7A, 7B, 7C, and 7D are sectional views illustrating a display panel structure capable of implementing a shielding mode, a reflection mode, and a transmission mode through control of the intensity (pulse amplitude) of a driving voltage using the electrical behavioral characteristics of the particles illustrated in FIG. 5, according to an embodiment of the present disclosure.

In FIGS. 5A-5C, 6A-6D, and 7A-7D, first particles 503, 603, and 703 and second particles 508, 608, and 708 have different colors, and core particles and shell materials of the first and second particles have opposite polarities.

A lower electrode is patterned for each unit cell on a lower substrate. The reflection mode, the transmission mode, and the shielding mode are implemented by selectively controlling the application time (pulse width) of the driving voltage or the intensity (pulse amplitude) of the driving voltage for each unit cell.

In FIGS. 5A-5C, a particle serving as a core of each of the first particles (white) 503 has a negative charge, and a coating material coated on the surface of the core particle has a positive charge. In this case, a negative charge value of the core particle is set to be larger than a positive charge value of the coating material coated on the surface of the core particle. A particle serving a core of each of the second particles (black) 508 has a positive charge, and a coating material coated on the surface of the core particle has a negative charge. In this case, a positive charge value of the core particle is set to be larger than a negative charge value of the coating material coated on the surface of the core particle.

In FIG. 5A, when the charge amount of the core particle of the first particle (white) 503 is similar to that of the core particle of the second particle (black) 508, the two core particles having opposite polarities have the same threshold voltage. In addition, since the charge value of the materials coated on the core particles are smaller than that of the core particles, the threshold voltage of the coating materials is higher than that of the core particles. Therefore, when a voltage corresponding to the threshold voltage of the two core particles is applied from outside to generate an electric field, this electric field first affects the charge of the core particles, so that as illustrated in FIG. 5B, the two particles exhibit behavioral characteristics due to electrophoresis depending on the polarity of the charge of the core particles. In other words, each of the two first and second particles moves toward a corresponding electrode to which a voltage of a polarity opposite to that of the charge of the core particles is applied.

According to the color of the particles that is positioned on a display unit by exhibiting such behavioral characteristics due to electrophoresis, the shielding mode (or absorption mode) as illustrated in FIGS. 6A and 7A and the reflection mode as illustrated in FIGS. 6B and 7B may be implemented.

Referring to FIGS. 6C and 7C, if the charge amount of the coating materials is larger than that of the core particles, the coating materials have a lower threshold voltage than the core particles. When the threshold voltage of the coating materials is applied to generate an electric field, the first and second particles exhibit an electrophoresis phenomenon due to the polarity of the charge of the coating materials.

If the application time is extended longer than the voltage application time applied to implement the shielding mode or the absorption mode through the electrophoresis phenomenon (FIG. 6C) or the intensity of the driving voltage is increased higher than the applied threshold voltage (FIG. 7C), the electric field affects not only the charge of the two core particles but also the charge of the coating materials. At the moment when the strength of the electric field sufficiently affects the charge of the coating materials, as illustrated in FIG. 5C, the negatively charged core particle or negatively charged coating material in one particle tends to move toward an electrode to which a positive voltage is applied, while the positively charged core particle or positively charged coating material in one particle tends to move toward an electrode to which a negative voltage is applied.

In this case, two adjacent different particles exhibit completely different movements depending on the angle at which the particles approach each other. If one particle approaches the bottom of the other particle and is arranged nearly perpendicular to the direction of dipole, a positively charged region of one particle meets a negatively charged region of the other particle, so that the two particles have an attractive force therebetween. In contrast, if one particle is arranged side by side next to the other particle, a negatively charged region and the positively charged region of one particle are arranged side by side with the negatively charged region and a positively charged region of the other particle, so that the two particles have a repulsive force therebetween. The particles moving by the attractive force and repulsive force gradually approach each other by the attractive force. As a result, the particles are arranged vertically and horizontally between the electrodes.

This is very different in particle structure and driving mechanism from a transmission mode of a conventional technique in which a chain structure is formed due to the electrorheological property of particles illustrated in FIG. 3E.

While the particle applied to the present disclosure have both positive and negative charges, the positively charged and negatively charged regions within the particles are physically separated from each other, the particles illustrated in FIG. 3E have only one of a positive charge or a negative charge.

In addition, the particles illustrated in FIG. 3E form chains by aggregation or electric polarization of charged particles in an electric field on the basis of a dipole-dipole interaction mechanism, thereby implementing the transmission mode.

On the other hand, in FIGS. 5C, 6C, and 7C according to the present disclosure, the particles 503, 603, 703, 508, 608, and 708 are vertically arranged at regular intervals between the electrodes, and a gap is generated by the repulsive force between the particles arranged side by side. The light beam incident from outside is transmitted through this gap, thereby implementing the transmission mode on the basis of a regular vertical arrangement and a regular horizontal arrangement of the particles.

Figure 1B:
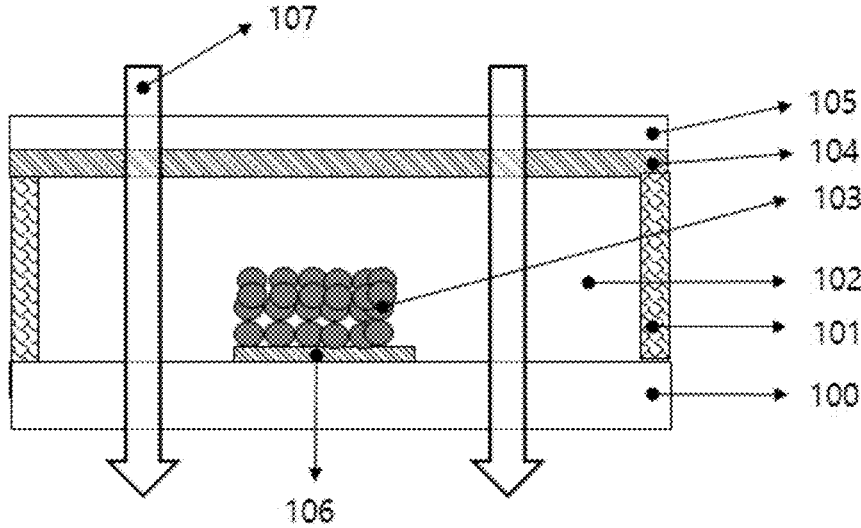

In other words, the transmission mode may be stably implemented without requiring a complicated driving method using high voltage and high frequency (FIG. 3E) and electrode patterning of a unit cell or sub-cell (FIGS. 1B, 2D, and 3C).

FIGS. 8A, 8B, and 8C are images demonstrating the shielding mode (FIG. 8A), the reflection mode (FIG. 8B), and the transmission mode (FIG. 8C) by controlling the application time (pulse width) of a driving voltage by a driving method according to the present disclosure, using a display panel film manufactured according to the embodiment of FIGS. 6A, 6B, 6C, and 6D).

Referring to FIGS. 8A, 8B, and 8C, a panel was manufactured by using transparent electrodes 604 and 606 and substrates 600 and 605 and filling a unit cell with a mixture in which the first white particles 603 and the second black particles 608 are dispersed in the transparent fluid 602.

In this case, the core particle of each of the first particles (white) 603 has a negative charge, the coating material has a positive charge, and the negative charge value of the core particle is larger than the positive charge value of the coating material coated on the surface of the core particle. The core particle of each of the second particles (black) 608 has a positive charge, the coating material has a negative charge, and the positive charge value of the core particle is larger than the negative charge value of the coating material coated on the surface of the core particle. In addition, the total charge amount of the first particle 603 is similar to that of the second particle 608.

Referring to FIGS. 6A and 8A, as a result of applying a driving voltage of −7.9 V to the upper transparent electrode 604 corresponding to the display unit for 500 ms, the black particles 608 having a positive charge on core particles moved to the upper electrode 604 and absorbed (see the arrow 609) the light beam 607 incident from outside so as to implement a black image, thereby performing the function of the shielding mode.

Referring to FIGS. 6B and 8B, it was tested whether the function of the reflection mode was performed to implement a color by reflecting a visible light beam of a specific wavelength band in the light beam 607 incident from outside depending on the color of the particles. As a result of applying a driving voltage of +7.9 V to the upper transparent electrode 604 corresponding to the display unit for 500 ms, the white particles 603 having a negative charge on core particles moved upwards and reflected (see the arrow 609) the light beam 607 incident from outside so as to implement a white image.

Referring to FIGS. 6C and 8C, it was tested whether the function of the transmission mode was performed. As a result of increasing the time for which a voltage of +7.9 V is applied to the upper electrode 604 of the display unit to 2 s, the particles 603 and 608 were vertically and horizontally arranged from the upper electrode to the lower electrode, and an LED light beam was transmitted from the lower substrate to the upper substrate of the panel, thereby visually confirming a numerical image displayed by the LED light beam. In addition, when a driving voltage of −7.9 V was applied to the display unit for 2 s, the function of the transmission mode was also implemented.

FIGS. 9A, 9B, 9C, 9D, 9E, and 9F are images demonstrating the shielding mode, the reflection mode, and the transmission mode by controlling the intensity (pulse amplitude) of a driving voltage by a driving method according to the present disclosure, using a display panel film manufactured according to the embodiment of FIGS. 7A, 7B, 7C, and 7D).

FIGS. 7A-7D and 9A-9F, a panel was manufactured by using transparent electrodes 704 and 706 and substrates 700 and 705 and filling a unit cell with a mixture in which white particles 703 and black particles 708 were dispersed in a transparent fluid 702.

Referring to 9, it was tested whether the function of the shielding mode was performed to absorb or reflect a light beam incident from outside and the function of the reflection mode was performed depending on the color of particles. As a result of applying a driving voltage of −8 V to the upper transparent electrode corresponding to a display unit for 500 ms, the black particles having a positive charge on core particles moved upwards and absorbed the light beam incident from outside so as to implement a black image (see FIGS. 9B and 9D). As a result of applying a driving voltage of +8 V to the upper transparent electrode for 500 ms, the white particles having a negative charge on core particles moved upwards and reflected the light beam incident from outside to implement a white image (see FIGS. 9A and 9E).

In addition, it was tested whether the function of the transmission mode was performed by controlling the intensity of an applied voltage. As a result of placing a printed character on a back side of the panel and applying a driving voltage of +15 V to the upper electrode for 500 ms, the particles were arranged vertically and horizontally from the upper electrode to the lower electrode, so that the light beam incident from outside was transmitted from the upper substrate to the lower substrate and reached the printed character placed on the back side of the panel, thereby visually confirming an image reflected by the printed character (see FIG. 9F).

Figures 9A, 9B, 9C, 9D, 9E, 9F:
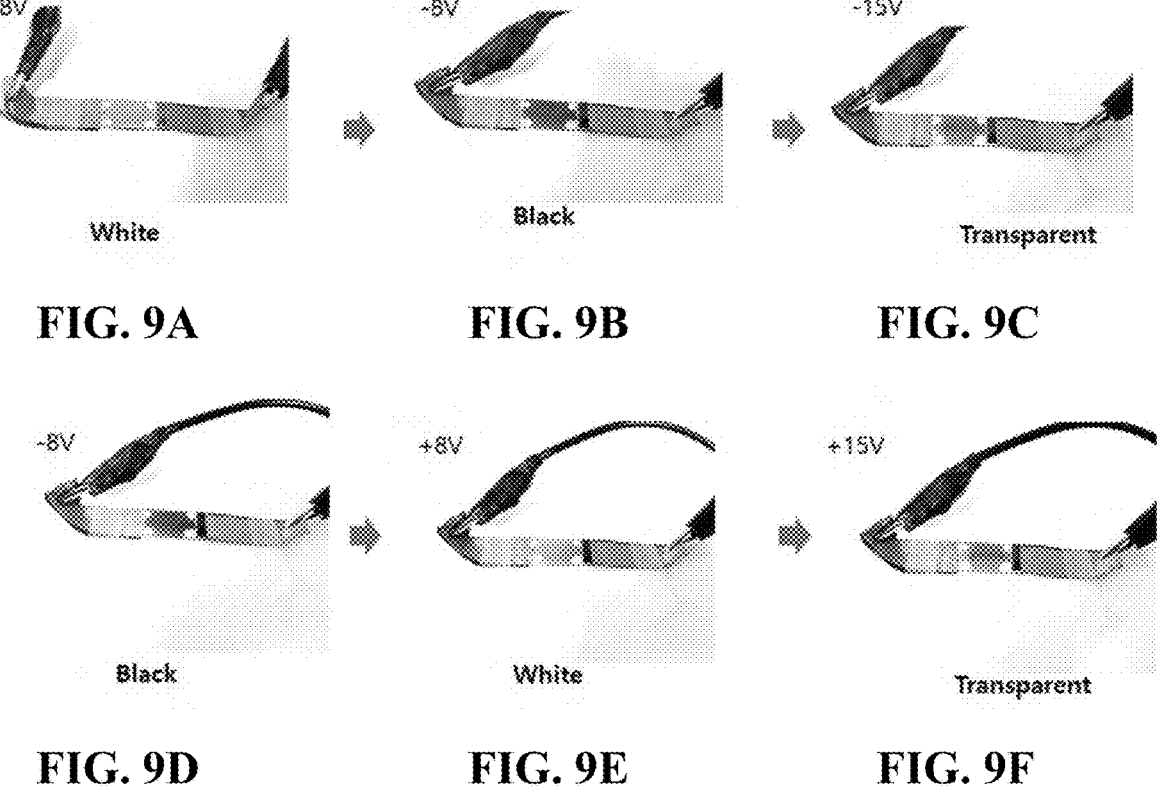
FIGS. 9A, 9B, 9C, 9D, 9E, and 9F are images demonstrating the shielding mode, the reflection mode, and the transmission mode using a display panel film manufactured according to the embodiment of FIGS. 7A, 7B, 7C, and 7D.

In addition, when a driving voltage of −15 V was applied to the display unit for 500 ms, the function of the transmission mode was also implemented (see FIG. 9C)

Figure 10:
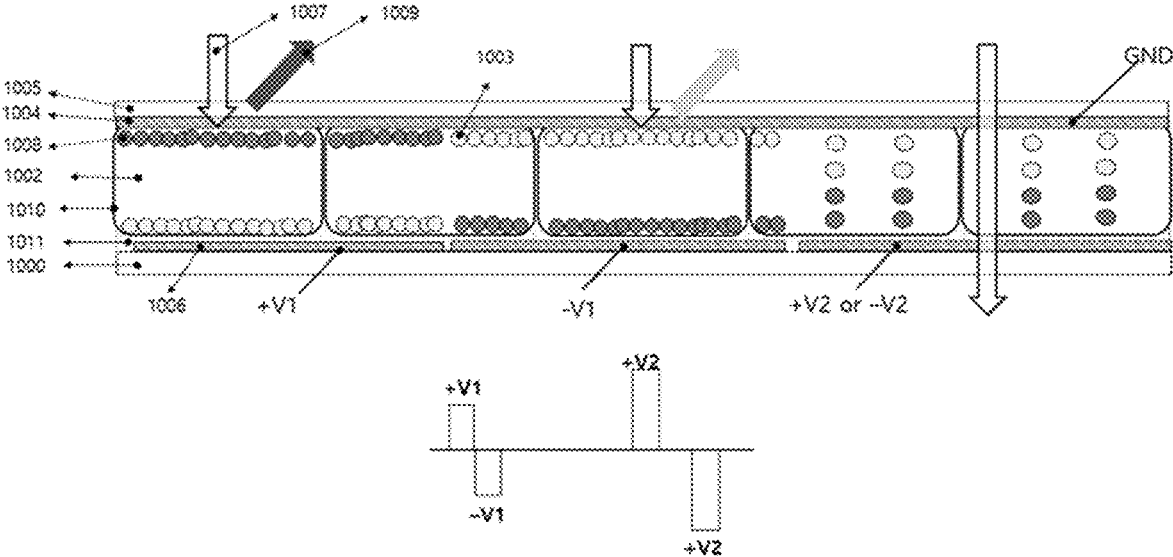
FIG. 10 is a sectional view illustrating a microcapsule-type panel structure capable of implementing a shielding mode, a reflection mode, and a transmission mode through control of the intensity (pulse amplitude) of a driving voltage, according to an embodiment of the present disclosure.

FIG. 10 is a sectional view illustrating a microcapsule-type panel structure capable of implementing a shielding mode, a reflection mode, and a transmission mode through control of the intensity (pulse amplitude) of a driving voltage, according to an embodiment of the present disclosure.

Referring to FIG. 10, the present disclosure of a method of manufacturing a panel by configuring a unit cell or sub cell with partition walls 601 and 701 illustrated in FIGS. 6 and 7 may be applied to a panel structure in which particles 1003 and 1008 dispersed in a transparent fluid 1002 are encapsulated in a microcapsule 1010 to form a display layer. Also, the shielding mode, the reflection mode, and the transmission mode may be implemented by the above-described driving method of controlling the time and intensity of an applied voltage.

Because the particles 1003 and 1008 dispersed in the transparent fluid exhibit electrical behavioral characteristics by the direction, intensity, duration, and the like of an electric field formed by a voltage applied from outside, the particles may exhibit different behavioral characteristics even within each separated capsule space depending on the voltage applied to a patterned lower electrode.

FIGS. 11A, 11B, and 11C are sectional views illustrating a reflective display panel structure capable of implementing three colors and a driving method therefor, according to an embodiment of the present disclosure.

Referring to FIGS. 11A, 11B, and 11C, first particles 1003 having a negative charge and exhibiting a first color and second particles 1008 having a positive charge and exhibiting a second color are used. The first and the second particles 1003 and 1008 have to have a higher permittivity than a transparent fluid 1102 in order to maximize the dielectrophoresis phenomenon using high voltage and high frequency described above with reference to FIGS. 3A-3E.

In order to implement a third color, particles 1112 having no positive or negative charge or having an extremely low charge value and exhibiting the third color are used. In this case, the permittivity of the third particles 1112 has to be lower than that of the transparent fluid and the first and the second particles 1003 and 1008 so as not to be affected by the dielectrophoresis phenomenon.

Referring to FIGS. 11A, 11B, and 11C, When a threshold voltage sufficient to affect the charge value of the first and the second particles 1003 and 1008 is applied from outside, the first particles 1103 having a positive charge move in the direction of an electrode to which a negative voltage is applied, while the second particles 1108 having a negative charge move in the direction of an electrode to which a positive voltage is applied. In this case, the first color (black) and second color (white) may be implemented as illustrated in FIGS. 11A and 11B, respectively, by the colors of the particles positioned on the upper electrode corresponding to a display unit. When the electric field by the threshold voltage of the first and second particles 1103 and 1108 is generated, the third particles 1112 having a relatively low charge amount or having no polarity maintain a dispersed state in the fluid 1102 without exhibiting electrical behavioral characteristics.

If a high voltage higher than the threshold voltage of the first and second particles 1103 and 1108 is applied at a high frequency, as illustrated in FIG. 11C, the first and second particles 1103 and 1108 move irregularly due to dielectrophoresis caused under application of a non-uniform electric field and are gradually positioned to the edge of a unit cell or sub-cell. However, the third particles 1112 having a relatively low permittivity may exhibit the third color by maintaining the dispersed state in the fluid 1102.

The present disclosure illustrated in FIGS. 11A, 11B, and 11C may also be applied to the microcapsule-type panel structure illustrated in FIG. 10.

FIGS. 12A, 12B, 12C, and 12D are sectional views illustrating a full-color reflective display panel structure capable of implementing four colors and a driving method therefor, according to an embodiment of the present disclosure.

Figures 12A, 12B, 12C, 12D:
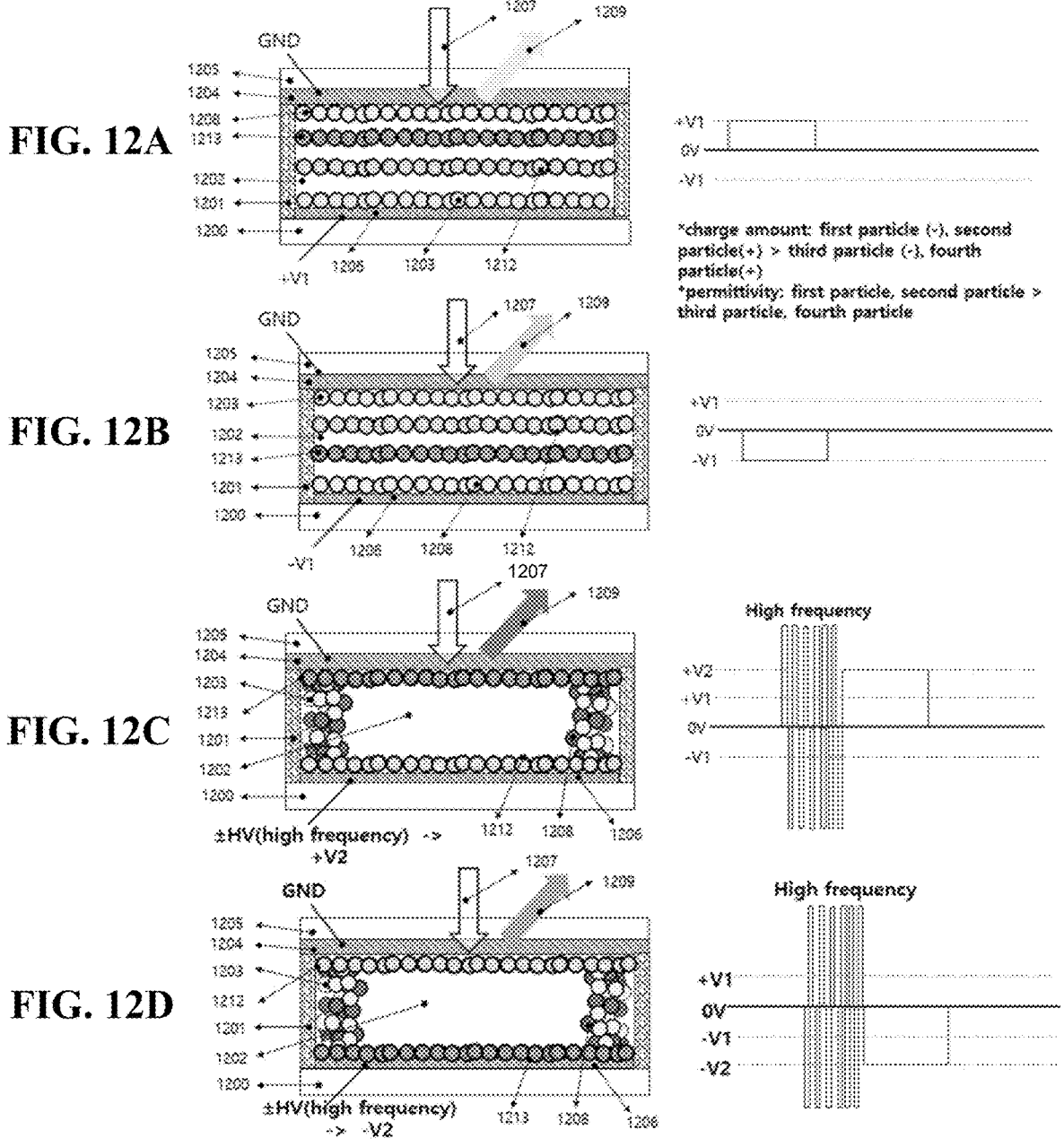
FIGS. 12A, 12B, 12C, and 12D are sectional views illustrating a full-color reflective display panel structure capable of implementing four colors and a driving method therefor, according to an embodiment of the present disclosure.

Referring to FIGS. 12A and 12B, in order to implement four colors according to the present disclosure, first particles 1203 having a negative charge and exhibiting a first color, and second particles 1208 having a positive charge and exhibiting a second color, third particles 1212 having a negative charge and exhibiting a third color, and fourth particles 1213 having a positive charge and exhibiting a fourth color are used. Also, the charge amount and the permittivity of the first and second particles 1203 and 1208 have to be larger than those of the third and fourth particles 1212 and 1213. In other words, the first and second particles 1203 and 1208 have a relatively low threshold voltage because the charge amount thereof is larger than that of the third and fourth particles 1212 and 1213. The first and second particles 1203 and 1208 having a relatively high permittivity exhibit behavioral characteristics due to dielectrophoresis before the third and fourth particles 1212 and 1213 when a high voltage is applied at a high frequency from the outside.

For such a reason, when a first threshold voltage at which the first and second particles 1203 and 1208 behave is applied, the first particles 1203 having a negative charge move in the direction of an electrode to which a positive voltage is applied, while the second particles 1208 having a positive charge move in the direction of an electrode to which a negative voltage is applied, so that the first and second colors are implemented as illustrated in FIGS. 12A and 12B.

Referring to FIGS. 12C and 12D, when a minimum high frequency and high voltage at which the first and second particles 1203 and 1208 exhibit behavioral characteristics due to dielectrophoresis are applied, the first and second particles 1203 and 1208 are positioned to the edge of a unit cell or sub-cell, while the third and fourth particles 1212 and 1213 maintain a dispersed state in a fluid 1202. When a second threshold voltage at which the third and fourth particles 1212 and 1213 having a driving voltage higher than the threshold voltage of the first and second particles 1203 and 1208 undergo electrophoresis immediately after the first and second particles 1203 and 1208 are positioned to the edge of the unit cell or sub-cell by dielectrophoresis, the third and fourth particles 1212 and 1213 located closest to two electrodes 1204 and 1206 operate first. As illustrated in FIGS. 12C and 12D, the third particles 1212 having a positive charge move in the toward the electrode to which a negative voltage is applied, while the fourth particles 1213 having a negative charge move toward the electrode to which a positive voltage is applied, so that the third and fourth colors are implemented.

In FIGS. 12A, 12B, 12C, and 12D, when the applied four types of particles have colors of magenta, cyan, yellow, and white, respectively, full color can be implemented by color combination of the color particles.

In addition, the present disclosure illustrated in FIGS. 12A, 12B, 12C, and 12D may also be applied to the microcapsule-type panel structure illustrated in FIG. 10.

Figures 13A, 13B, 13C:
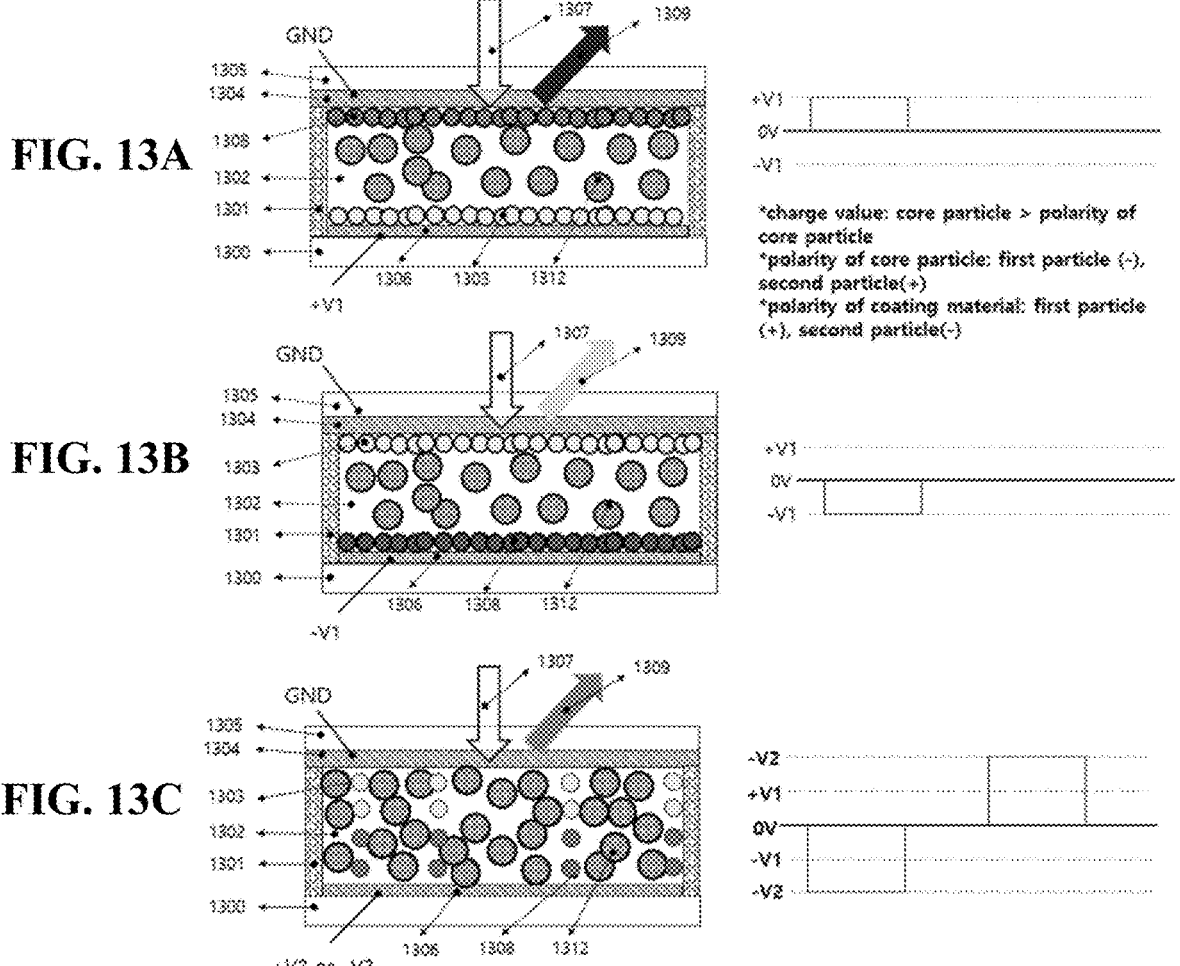
FIGS. 13A, 13B, and 13C are sectional views illustrating a reflective display panel structure capable of implementing three colors and a driving method therefor, according to an embodiment of the present disclosure.

FIGS. 13A, 13B, and 13C are sectional views illustrating a reflective display panel structure capable of implementing three colors and a driving method therefor, according to an embodiment of the present disclosure.

FIGS. 13A, 13B, and 13C illustrate the reflective display panel structure capable of implementing three colors in a different manner from that illustrated in FIGS. 11A, 11B, and 11C, and the driving method therefor. Each of first and second particles 1303 and 1308 exhibiting first and second colors has a structure in which a core particle and a coating material coated on the core particle are charged with opposite polarities so that one particle has both a positive charge and a negative charge. In this case, the core particle and the coating material have different charge values. In addition, third particles 1312 exhibiting a third color dispersed in a transparent fluid 1302 together with the first and second particles 1303 and 1308 have to have no polarity. If the third particles 1312 have a polarity, they have to have one of positive and negative charges and the charge value thereof has to be extremely low.

Referring to FIGS. 13A and 13B, the first particles 1303 exhibiting the first color have a negative charge on core particles and a positive charge on coating materials, the second particles 1308 exhibiting the second color have a positive charge on core particles and a negative charge on coating materials, and the third particles 1312 exhibiting the third color have neither positive nor negative charge or have an extremely low charge value than the charge value of the first particles 1303 and the second particles 1308. In this case, the charge amount of the first particles 1303 are set to be similar to that of the second particles 1308 and the charge value of the core particles are set to be larger than that of the coating materials. In other words, the third particles 1312 are not affected by first and second driving voltages.

When a threshold voltage of the first and second particles 1303 and 1308 is applied from outside to generate an electric field, this electric field first affects the charge of the core particles because the charge value of the first and second core particles is larger than that of the coating materials coated on the core particles and thus the driving voltage is relatively low, so that as illustrated in FIGS. 13A and 13B, the first and second particles 1303 and 1308 undergo electrophoresis depending on the polarity of the charge of the core particles.

In other words, the first and second particles 1303 and 1308 move toward electrodes to which a voltage of a polarity opposite to that of the charge of the core particles is applied. In this case, the first and second colors may be implemented depending on the colors of the first and second particles 1303 and 1308 positioned on a display unit.

Referring to FIG. 13C, if the voltage is continuously applied or the intensity of the applied voltage is increased even after the first and second particles move to the upper electrode 1304 or the lower electrode 1306, an electric field affects not only the charge of the core particles but also the charge of the coating materials of the first and second particles 1303 and 1308. At the moment when the strength of the electric field sufficiently affects the charge of the coating materials, the negatively charged core particle or negatively charged coating material in one particle tends to move toward the electrode to which a positive voltage is applied, while the positively charged core particle or positively charged coating material in one particle tends to move toward the electrode to which a negative voltage is applied. In this case, two adjacent different particles of the first and second particles 1303 and 1308 exhibit completely different movements depending on the angle at which the particles approach each other. If one particle approaches the bottom of the other particle and is arranged nearly perpendicular to the direction of dipole, a positively charged region of one particle meets a negatively charged region of the other particle, so that the two particles have an attractive force therebetween. In contrast, if one particle is arranged side by side next to the other particle, a negatively charged region and the positively charged region of one particle are arranged side by side with the negatively charged region and a positively charged region of the other particle, so that the two particles have a repulsive force therebetween. The particles moving by the attractive force and repulsive force gradually approach each other by the attractive force. As a result, the first and second particles 1303 and 1308 are arranged vertically and horizontally between the electrodes. The third particles 1312 having an extremely low charge value or no polarity may maintain a dispersed state in the transparent fluid, thereby implementing the third color.

FIGS. 14A, 14B, 14C, and 14D are images demonstrating three colors as the experimental results of driving a reflective color display panel film manufactured according to FIG. 13 using three types of particles.

Referring to FIGS. 14A, 14B, and 14C and FIGS. 13A-13C, first particles 1303 exhibiting white have a structure in which core particles have a negative charge and coating materials have a positive charge. Second particles 1308 exhibiting black have a structure in which core particles have a positive charge and coating materials have a negative charge. Third particles exhibiting yellow green have a structure in which one particle has a single negative charge, and have a charge value extremely lower than that of the first and second particles.

FIGS. 14A, 14B, and 14C are images sequentially illustrating that three colors are implemented by controlling the direction of an electric field and the intensity of an applied voltage. As a result of sequentially applying +8 V and −8 V, which are the threshold voltages of the first and second particles, and a driving voltage of −15 V, which is higher than the threshold voltages, to the upper electrode, in the case of +8 V, the white particles having a negative charge on the core particles were positioned on the surface of the upper electrode so as to implement a white image. In the case of −8 V, the black particles having a positive charge on the core particles were positioned on the upper electrode so as to implement a black image. In the case of −15 V, the first and second particles were arranged vertically and horizontally, and thus a yellow green image was implemented by the exposed third particles. Also, in the case of +15 V, a yellow green image was implemented.

FIGS. 14D and 13 are images illustrating that three colors are implemented by controlling the direction of an electric field and the time of an applied voltage. The first particles 1303 exhibiting white have a structure in which the core particles have a negative charge and the coating materials have a positive charge. The second particles 1308 exhibiting black have a structure in which the core particles have a positive charge and the coating materials have a negative charge. Third particles 1312 exhibiting pink have a structure in which one particle has a single negative charge, and have a charge value extremely lower than that of the first and second particles. As a result of applying driving voltages of +10 V and −10 V by adjusting the pulse width based on 250 ms, which is the response time required for the first and second particles to move to the upper and lower electrodes, in the case of +10 V (250 ms), the white particles having a negative charge on the core particles were positioned on the surface of the upper electrode so as to implement a white image. In the case of −10 V (250 ms), the black particles having a positive charge on the core particles were positioned on the upper electrode so as to implement a black image. In the case of −10 V (1 s), the first and second particles were arranged vertically and horizontally, and thus a pink image was implemented by the exposed third particles. Also, in the case of +10 V (1.5 s), a pink image was implemented.

Figure 15:
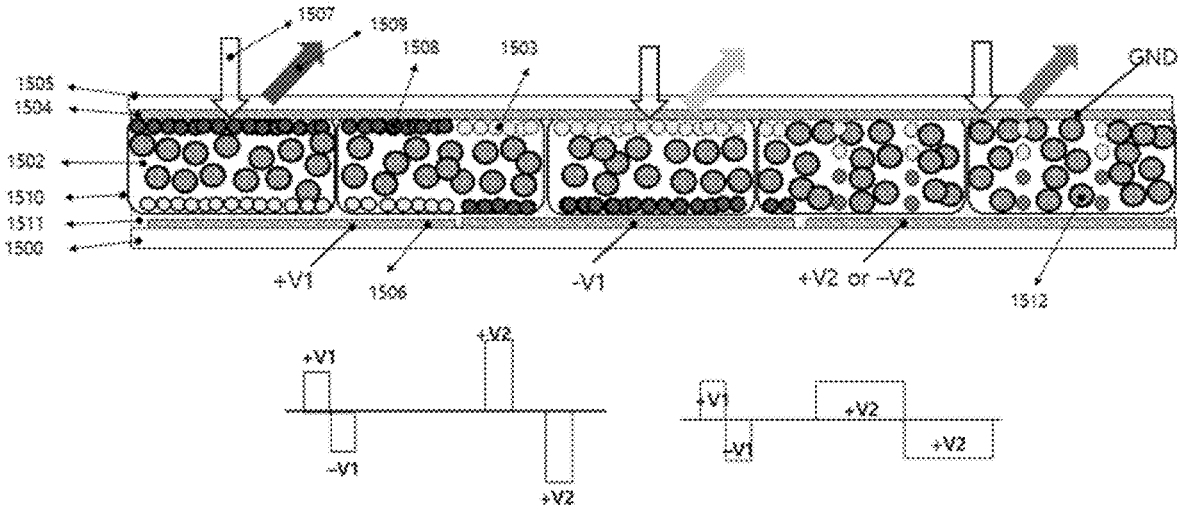
FIG. 15 is a sectional view illustrating a microcapsule-type display panel capable of implementing three colors and a driving method therefor, according to an embodiment of the present disclosure.

FIG. 15 is a sectional view illustrating a microcapsule-type display panel capable of implementing three colors and a driving method therefor, according to an embodiment of the present disclosure. In this embodiment, the unit cell-type method of implementing three colors illustrated in FIGS. 13A-13C and 14A-14D is applied to the microcapsule-type structure.

FIGS. 16A-16D is an image illustrating a microcapsule-type film and a display panel on which three colors are implemented, manufactured according to an embodiment of the present disclosure illustrated in FIG. 15.

In order to manufacture a microcapsule-type display panel as illustrated in FIG. 15, as illustrated in FIG. 16A, first particles 1503, second particles 1508, third particles 1512 having different colors were dispersed in a transparent fluid and encapsulated in a capsule 1510, mixed with a binder or an adhesive layer 1511, and applied on a substrate 1500 made of a PET material and coated with a transparent electrode 1506, thereby manufacturing a microcapsule-type film. In this case, the used particles are the same as those used in the experiment described with reference to FIGS. 14A-14D.

The microcapsule-type film (used as a display unit and an upper substrate) thus manufactured and a segment-type FPCB used as a lower substrate were laminated, thereby manufacturing a microcapsule-type panel having a structure as illustrated in FIG. 15. As a result of driving the panel by controlling the application time and intensity of a driving voltage by the driving method illustrated in FIG. 15, three colors were implemented as illustrated in FIGS. 16A, 16B, 16C, and 16D.

FIGS. 17A, 17B, 17C, and 17D are sectional views illustrating a display panel structure capable of implementing four colors and a driving method therefor, according to an embodiment of the present disclosure.

Figures 17A, 17B, 17C, 17D:
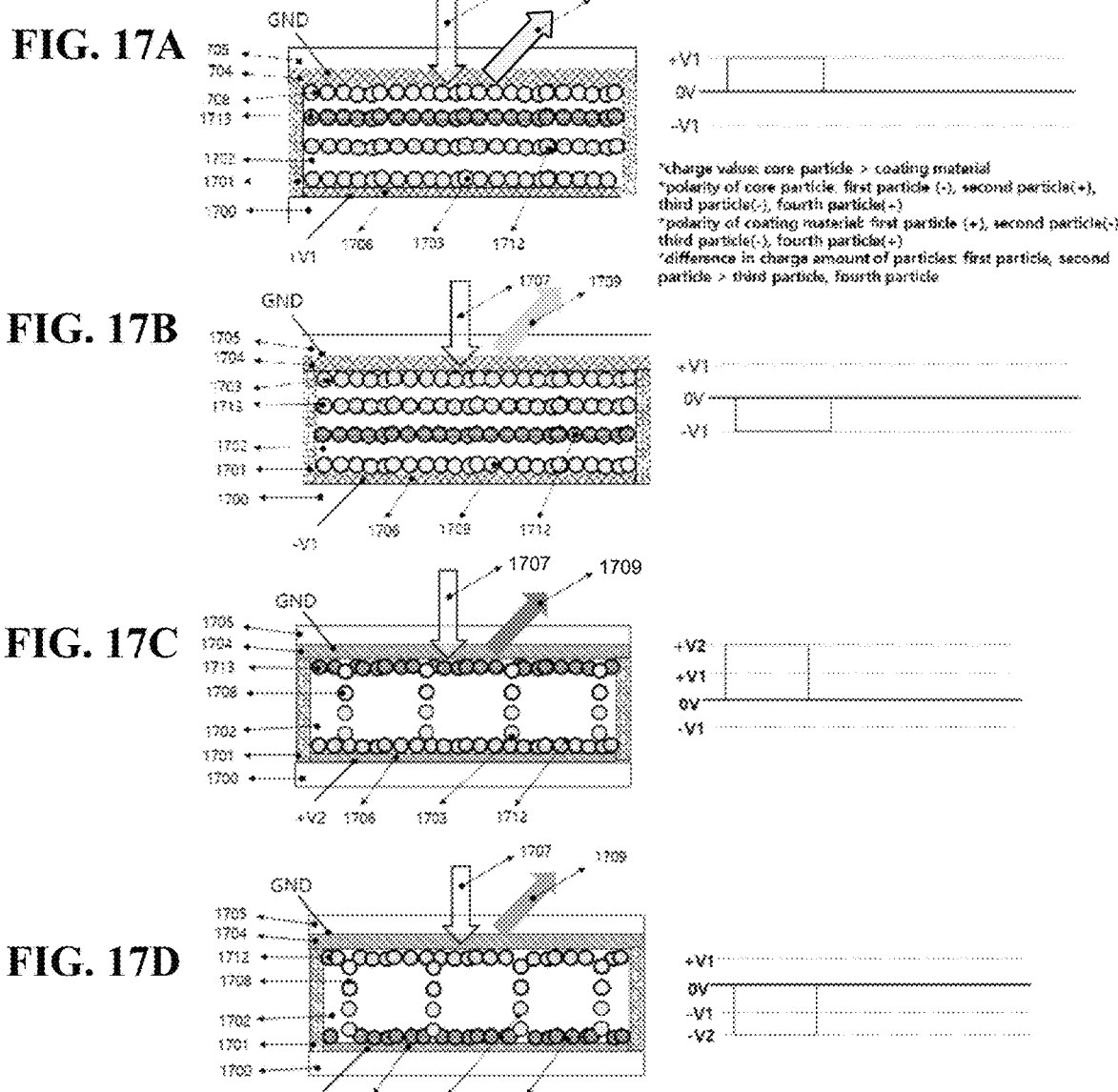
FIGS. 17A, 17B, 17C, and 17D are sectional views illustrating a display panel structure capable of implementing four colors and a driving method therefor, according to an embodiment of the present disclosure.

Referring to FIGS. 17A, 17B, and 17C, the display panel structure has a structure in which four types of particles of different colors are dispersed in a transparent fluid and filled in a unit cell. Each of first and second particles 1703 and 1708 has a structure in which a core particle and a coating material coated on the core particle are charged with opposite polarities so that one particle has both a positive charge and a negative charge. In this case, the core particle and the coating material have different charge values. Third and fourth particles 1712 and 1713 have a structure in which one particle has one of a positive charge and a negative charge.

Referring to FIGS. 17A, 17B, 17C, and 17D, in the case of the first and second particles 1703 and 1708, the charge value of core particles thereof is larger than that of coating materials, the first particles 1703 have a negative charge on the core particles and a positive charge on the coating materials, and the second particles 1708 have a positive charge on the core particles and a negative charge on the coating materials. The third particles 1712 have a negative charge, and the fourth particles 1713 have a positive charge. In addition, the charge amount of the first and second particles 1703 and 1708 is larger than that of the third and fourth particles 1712 and 1713. In other words, in FIGS. 17A, 17B, 17C, and 17D, the first and second particles have the same driving voltage and have a relatively lower threshold voltage than that of the third and fourth particles.

In FIGS. 17A, 17B, 17C, and 17D, when a voltage corresponding to the threshold voltage of the first and second particles is applied from outside to generate an electric field, this electric field first affects the charge of the core particles, so that as illustrated in FIGS. 17A and 17B, the first and second particles 1703 and 1708 exhibit behavioral characteristics due to electrophoresis depending on the polarity of the charge of the core particles.

In other words, the first and second particles 1703 and 1708 move toward a corresponding electrode to which a voltage of a polarity opposite to that of the charge of the core particles is applied, and the third and fourth particles maintain a dispersed state in the fluid 1702 because the applied voltage is lower that the threshold voltage of the third and fourth particles. As illustrated in FIGS. 17A and 17B, first and second colors are implemented depending on the colors of the particles positioned on a display unit by using such behavioral characteristics due to electrophoresis.

Referring to FIGS. 17C and 17D, if third and fourth driving voltages, which are driving voltages higher than the threshold voltage of the first and second particles, is applied, an electric field affects not only the charge of the core particles but also the charge of the coating materials of first and second particles 1703 and 1708. As a result, the negatively charged core particle or negatively charged coating material in one particle tends to move toward the electrode to which a positive voltage is applied, while the positively charged core particle or positively charged coating material in one particle tends to move toward the electrode to which a negative voltage is applied. In this case, two adjacent different particles of the first and second particles 1703 and 1708 exhibit completely different movements depending on the angle at which the particles approach each other. If one particle approaches the bottom of the other particle and is arranged nearly perpendicular to the direction of dipole, a positively charged region of one particle meets a negatively charged region of the other particle, so that the two particles have an attractive force therebetween. In contrast, if one particle is arranged side by side next to the other particle, a negatively charged region and the positively charged region of one particle are arranged side by side with the negatively charged region and a positively charged region of the other particle, so that the two particles have a repulsive force therebetween. The particles moving by the attractive force and repulsive force gradually approach each other by the attractive force. As a result, the first and second particles 1703 and 1708 are arranged vertically and horizontally between the electrodes.

In this case, the third and fourth particles 1712 and 1713 having a single polarity move toward an upper or a lower electrode to which a voltage of a polarity opposite to that of the charge is applied, thereby implementing third and fourth colors depending on the colors of the particles positioned on a display unit.

In FIGS. 17A, 17B, 17C, and 17D, when the applied four types of particles have colors of magenta, cyan, yellow, and white, respectively, full color can be implemented by color combination of the color particles. These particle structure and driving method may also be applied to a microcapsule-type display panel structure.

FIGS. 18A, 18B, 18C, 18D, and 18E are sectional views illustrating a display panel structure capable of implementing four colors and a transmission mode conversion and a driving method therefor, according to an embodiment of the present disclosure.

Referring to FIGS. 18A, 18B, 18C, 18D, and 18E, the display panel structure has a structure in which four types of particles of different colors are dispersed in a transparent fluid and filled in a unit cell. Each of the four types of particles has a structure in which a core particle and a coating material coated on the core particle are charged with opposite polarities so that one particle has both a positive charge and a negative charge.

Referring to FIGS. 18A, 18B, 18C, 18D, and 18E, in the case of the four types of particles (first, second, third, and fourth particles), the charge value of core particles thereof is larger than that of coating materials, the first and third particles 1803 and 1812 have a negative charge on the core particles and a positive charge on the coating materials, and the second and fourth particles 1808 and 1813 have a positive charge on the core particles and a negative charge on the coating materials. In addition, the charge values of the core particles and the coating materials of the first and second particles are larger than those of the core particles and the coating materials of the third and fourth particles. Therefore, the core particles of the first and second particles have to have a lower threshold voltage than that of the third and fourth particles, and a driving voltage for allowing the third and fourth particles to be vertically arranged between the upper and lower electrodes has to be higher than the driving voltage of the first and second particles.

Figures 18A, 18B, 18C, 18D, 18E:
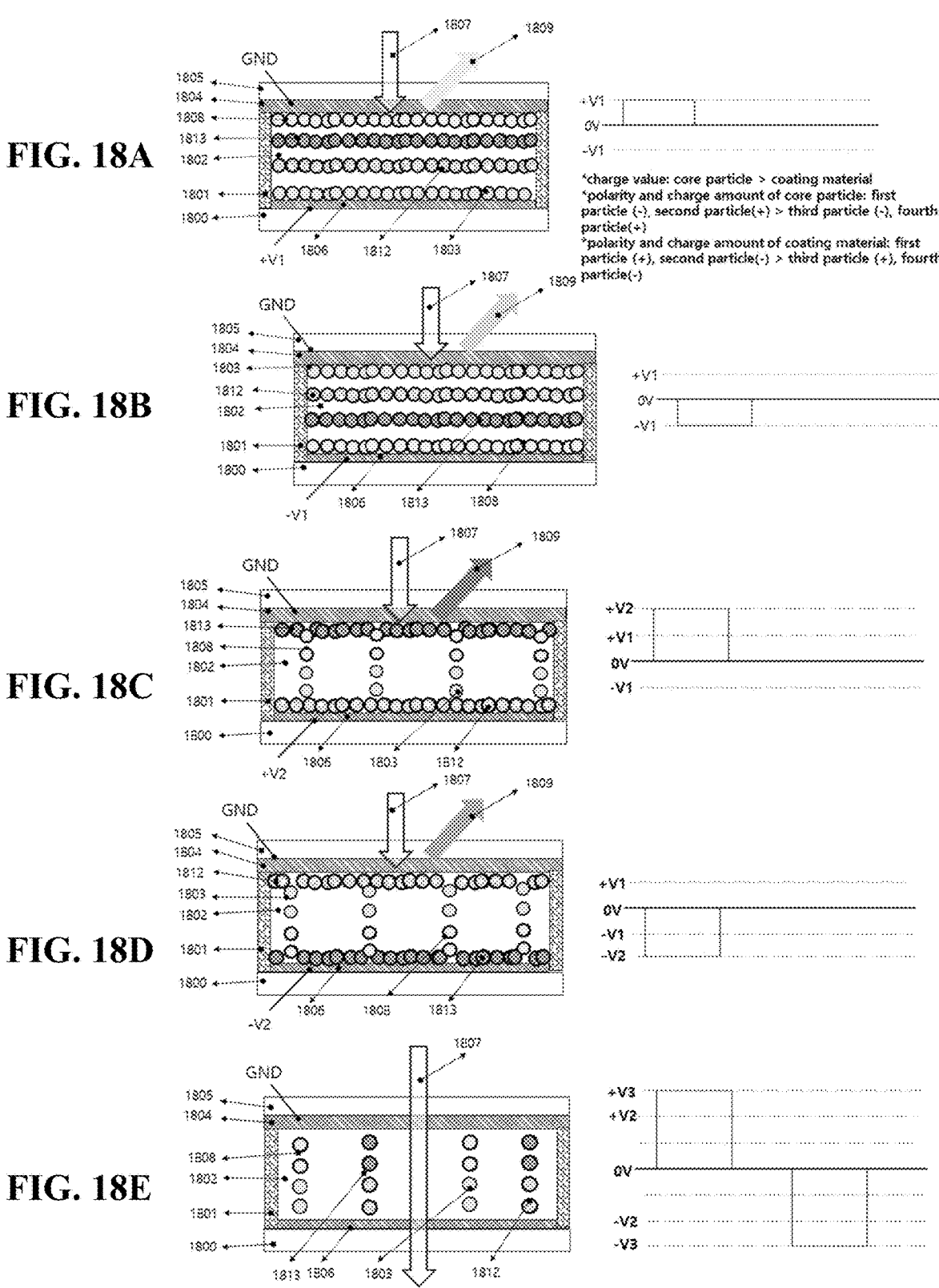
FIGS. 18A, 18B, 18C, 18D, and 18E are sectional views illustrating a display panel structure capable of implementing four colors and enabling a transmission mode conversion and a driving method therefor, according to an embodiment of the present disclosure.

Referring to FIGS. 18A and 18B, in the case of the first and second particles, when a first driving voltage, which is the minimum voltage at which the charge of the core particles is affected, is applied to generate an electric field, this electric field affects the charge of the core particles before the charge of the coating materials, and the first and second particles undergo electrophoresis depending on the polarity of the charge of the core particles, thereby implementing first and second colors depending on the colors of the particles positioned on according to the color of the particles positioned on a display unit.

In other words, the first and second particles move toward a corresponding electrode to which a voltage of a polarity opposite to that of the charge of the core particles is applied, and the third and fourth particles maintain a dispersed state in a fluid 1802 because the applied first voltage does not affect the charge of the core particles of the third and fourth particles.

Referring to FIGS. 18C and 18D, in the case of the third and fourth particles, when a second driving voltage higher than the first driving voltage at which the charge of the core particles is affected is applied, an electric field affects not only the charge of the core particles but also the charge of the coating materials of the first and second particles 1803 and 1808. As a result, the negatively charged core particle or negatively charged coating material in one particle tends to move toward the electrode to which a positive voltage is applied, while the positively charged core particle or positively charged coating material in one particle tends to move toward the electrode to which a negative voltage is applied. In this case, two adjacent different particles of the first and second particles 1803 and 1808 exhibit completely different movements depending on the angle at which the particles approach each other. If one particle approaches the bottom of the other particle and is arranged nearly perpendicular to the direction of dipole, a positively charged region of one particle meets a negatively charged region of the other particle, so that the two particles have an attractive force therebetween. In contrast, if one particle is arranged side by side next to the other particle, a negatively charged region and the positively charged region of one particle are arranged side by side with the negatively charged region and a positively charged region of the other particle, so that the two particles have a repulsive force therebetween. The particles moving by the attractive force and repulsive force gradually approach each other by the attractive force. As a result, first and second particles 1803 and 1808 are arranged vertically and horizontally between the electrodes.

In this case, the electric field affects only the charge of the core particles of the third and fourth particles 1812 and 1813, so that the third and fourth particles move toward a corresponding electrode to which a voltage of a polarity opposite to that of the charge of the core particles is applied, thereby implementing third and fourth colors depending on the colors of the third and fourth particles positioned on the display unit.

Referring to FIG. 18E, when a third driving voltage higher than the second driving voltage at which not only the charge of the core particles but also the charge of the coating materials of the third and fourth particles is applied, an electric field affects the charge of the core particles and the charge of the coating materials of the first particles 1803, the second particles 1808, the third particles 1812, and the fourth particles 1813, so that all the particles are arranged vertically and horizontally by attractive and repulsive forces and a light beam incident from outside may transmit between the arranged particles, thereby performing the function of a transmission mode.

In FIGS. 18A, 18B, 18C, 18D, and 18E, when the applied four types of particles have colors of magenta, cyan, yellow, and white, respectively, full color can be implemented by color combination of the color particles.

Figure 19A:
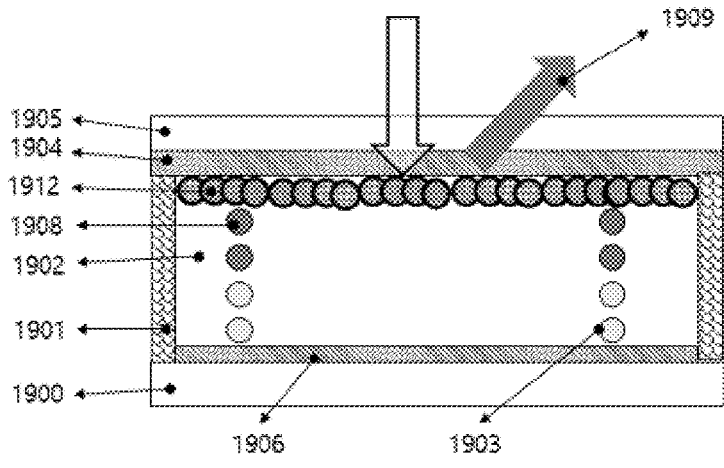
FIGS. 19A and 19B are sectional views illustrating a display panel structure capable of implementing three colors and a transmission mode conversion, according to an embodiment of the present disclosure.
Figure 19B:
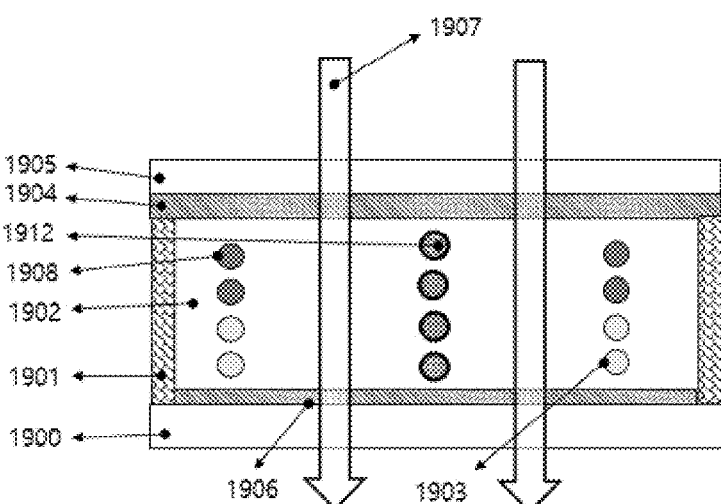

FIGS. 19A and 19B are sectional views illustrating a display panel structure capable of implementing three colors and a transmission mode conversion, according to an embodiment of the present disclosure. Depending on the purpose of use of a display or to increase transmittance, the number of used particles may be reduced. For example, particles of three colors may be used.

Figure 20:
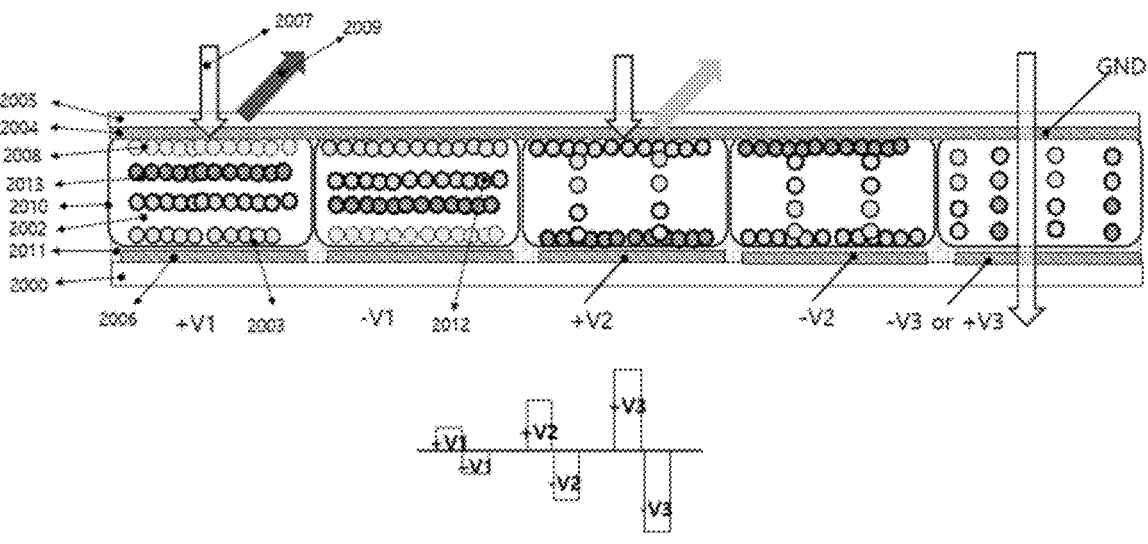
FIG. 20 is a sectional view illustrating a microcapsule-type display panel structure capable of implementing four colors and a transmission mode conversion, according to an embodiment of the present disclosure.

FIG. 20 is a sectional view illustrating a microcapsule-type display panel structure to which the driving method of implementing four colors and the transmission mode conversion illustrated in FIGS. 18A, 18B, 18C, 18D, and 18E is applied.

A manufacturing process applied to the specific embodiments of the present disclosure according to FIGS. 4A-4B to 20 and materials used in the process are as follows.

A display panel according to the present disclosure is consisting of a composite material phase in which a solid phase and a liquid phase are mixed.

An upper substrate is made of a light transparent material having a high transmittance, and may be a base film made of a material having a high transmittance of equal to or larger than 80%. The upper substrate is a transparent polymer film with excellent light transmittance, and may be made of polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), or cellulose triacetate (TAC), but is not limited thereto.

An upper electrode may be provided on a surface of the upper substrate, the surface facing a lower substrate. The upper electrode may apply the same voltage to a plurality of display layers. The upper electrode may be a plate-shaped common electrode shared by the plurality of display layers. The upper electrode may be provided on a side that can be visually observed, and may be made of a transparent conductive material such as indium tin oxide (ITO), indium zinc oxide (IZO), indium zinc tin oxide (IZTO), aluminum zinc oxide (AZO), ZnO, or a transparent conductive oxide (TCO).

A fluid may include a material such as water, methanol, ethanol, propanol, butanol, propylene carbonate, toluene, benzene, hexane, chloroform, isoparaffin oil, silicone oil, ester-based oil, hydrocarbon-based oil, triethylhexanoin, dimethicone, cetyl octanoate, dicaprylate, isopropyl myristate, and tocopherol acetate. The fluid may include a fluorescent material, a phosphorescent material, or a light emitting material, or a color variable material (e.g., a Zion pigment material, a Zion dye material, and the like) of which color characteristics change under application of energy.

A plurality of microcapsules may be fixed at predetermined intervals in a binder layer to form a space between each of the microcapsules. Adjacent microcapsules are not in direct contact with each other but separated from each other by the space.

The binder layer may include a material that is at least partially transparent in a visible light beam region of 380 nm to 750 nm. The binder layer may include at least one transparent polymer material selected from the group consisting of an acrylic-based polymer, a silicone-based polymer, an ester-based polymer, a urethane-based polymer, an amide-based polymer, an ether-based polymer, a fluorine-based polymer, and rubber. In addition, the binder layer may include a fluorescent material, a phosphorescent material, and a light emitting material, or a color variable material (e.g., a Zion pigment material, a Zion dye material, etc.) of which color characteristics change under application of energy.

An adhesive layer (or pressure-sensitive adhesive layer) may be formed using a pressure sensitive adhesive (PSA). As the pressure-sensitive adhesive, there may be used a material that prevents a change in optical properties of constituent members and does not require a curing process during adhesion treatment or a high-temperature process during drying. For example, as the adhesive layer (or pressure-sensitive adhesive layer), there may be used an appropriate polymer such as an acrylic-based polymer, a silicone-based polymer, polyester, polyurethane, polyether, or synthetic rubber. As the adhesive layer (or pressure-sensitive adhesive layer), there may be used a high-elasticity silicone rubber that not only serves as an adhesive (or pressure-sensitive adhesive) but also serves as a cushion to relieve an impact. The adhesive layer (or pressure-sensitive adhesive layer) may be cured by energy (e.g., heat or UV, etc.) or may be non-cured.

For example, the adhesive layer (or pressure-sensitive adhesive layer) may be an insulating organic material, and may be made of polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), or cellulose triacetate (TAC), but is not limited thereto.

A lower substrate may be a substrate made of various materials, such as plastic and metal. For example, the lower substrate may include a metal foil containing a metal such as silver and aluminum, or a plastic film having a back surface coated with a metal layer.

The lower substrate may be a substrate made of a flexible material that can be bent, curved, or rolled. In this case, the lower substrate may be a flexible printed circuit board. However, the present disclosure is not limited thereto, and the lower substrate may be made of a phenol-based or epoxy-based synthetic resin. In this case, the lower substrate may be a rigid printed circuit board. A lower electrode may be provided on a surface of the lower substrate. The lower electrode may apply the same or different voltages to the plurality of microcapsules.

The lower electrode has a single layer structure of copper, aluminum, indium tin oxide (ITO) or indium zinc oxide (IZO), or a multi-layer structure in which nickel or gold is further layered on a material of copper, aluminum, ITO, or IZO.

The microcapsules may be soft capsules or hard capsules, and may be manufactured by in-situ polymerization, a coacervation approach, or interfacial polymerization.

In the manufacture of the microcapsules, a polar or non-polar dispersion medium may be used as a fluid. For example, as the fluid, there may be used any one or more selected from the group consisting of water, methanol, ethanol, propanol, butanol, propylene carbonate, toluene, benzene, chloroform, hexane, cyclohexane, dodecane, perchlorethylene, trichloroethylene, and isopar-G, isopar-M, and isopar-H that are a kind of isoparaffin oil. A dye or a pigment may be added to the fluid.

As the dye or the pigment, there may be used an azo dye, an anthraquinone dye, a carbonium dye, an indigo dye, a sulfur dye, and a phthalocyanine dye. As the pigment, there may be used an inorganic pigment such as titanium dioxide, zinc oxide, lithopone, zinc sulfonate, carbon black, graphite, chrome yellow, zinc chromate, red oxide of iron, red lead, cadmium red, molybdate chrome orange, Milori blue, Prussian blue, iron blue, cobalt blue, chrome green, viridian, zinc green, aluminum powder, bronze powder, a fluorescent pigment, and a pearl pigment; or an organic pigment such as an insoluble azo-based pigment, a soluble azo-based pigment, a phthalocyanine-based pigment, a quinacridone-based pigment, a dioxazine-based pigment, an isoindolinone-based pigment, a vat dye-based pigment, a pilocholine-based pigment, a fluorocarbon-based pigment, a quinophthalone-based pigment, and a metal complex.

According to the in-situ polymerization, the microcapsules may be manufactured through a reaction process of forming an emulsion and structuring the emulsion in a core-shell form.

First, particles may be dispersed in a fluid to prepare a core material. In this case, the particles may be dispersed in an amount of 0.1 wt % to 25 wt % with respect to the fluid, but may be dispersed in a larger amount if necessary. A dispersion of the core material may be prepared using an ultrasonic disperser or a homogenizer.

Next, a prepolymer is prepared by mixing a polymer for forming a shell of a microcapsule and controlling the acidity. This process may be performed simultaneously with the process of preparing the dispersion of the core material.

As the polymer for forming the shell, there may be used a polymer precursor that exhibits low elasticity and is rigid, including a copolymer such as urea-formaldehyde, melamine-formaldehyde, and methyl vinyl ether-co-maleic anhydride; or a polymer such as gelatin, polyvinyl alcohol, polyvinyl acetate, a cellulosic derivative, acacia, carrageenan, carboxymethyl cellulose, hydrolyzed styrene anhydride copolymer, agar, alginate, casein, albumin, and cellulose phthalate. The polymer may be controlled in hydrophilicity and hydrophobicity, and thus may surround the core material to form a shell. In addition, the prepolymer may be dispersed in a fluid to prepare a dispersion, as in the case of the particles.

Next, an emulsion may be formed by mixing and stirring the dispersion of the core material and the prepolymer dispersion of the shell material. In order to form such an emulsion, it is necessary to optimize the ratio of the particles to the prepolymer, and the two dispersions may be mixed at a volume ratio of 1:5 to 1:12. In addition, a stabilizer may be added to improve dispersibility. Within the emulsion, the particles may become a dispersion phase and the shell material may become a continuous phase.

An additive may be added to increase the stability of the emulsion. The additive may be an organic polymer with high viscosity and excellent wettability after dissolution in an aqueous phase, and a specific example thereof may include at least one selected from the group consisting of gelatin, polyvinyl alcohol, sodium carboxymethyl cellulose, starch, hydroxyethyl cellulose, polyvinyl pyrrolidone, and alginate.

By controlling the pH and temperature of the emulsion thus formed, the dispersion of the shell material in a continuous phase is deposited around the particles in a dispersion phase to form the shell of a microcapsule, thereby encapsulating the dispersion of the core material.

In this case, an additive may be added so that the shell of the microcapsule is formed more densely to reduce the elasticity, thereby increasing the hardness of the shell. The additive to be added may be an ionic or polar material which is soluble in an aqueous phase. For example, there may be used at least one curing catalyst selected from the group consisting of ammonium chloride, resorcinol, hydroquinone, and catechol.

The coacervation approach may utilize an oil/water emulsion of the internal and external phases. The dispersion of the core material is coacervated (agglomerated) out of the aqueous external phase and deposited as shells around the oily droplets of the internal phase through control of temperature, pH, relative concentrations, and the like.

In the case of the coacervation approach, urea-formaldehyde, melamine-formaldehyde, gelatin, or Arabic rubber may be used as the shell material.

In the case of the interfacial polymerization, a lipophilic monomer in the internal phase is present as an emulsion in the aqueous external phase. The monomer in the internal phase droplets reacts with a monomer introduced into the aqueous external phase, polymerizing at the interface between the internal phase droplets and the surrounding aqueous external phase and forming shells around the droplets. Although the resulting shells are relatively thin and are permeable, this process does not require a heating process, unlike the other preparation processes, and thus any type of dielectric liquid may be used.

In the case of the display panel according to the embodiment of the present disclosure, regardless of the shape of the microcapsules, such as spherical, non-spherical, cuboidal, and the like, the elasticity of the microcapsules in contact with the electrodes after attachment is strengthened, so that the microcapsules have durability to absorb external pressure or shock.

In the case of a unit cell-type display panel, partition walls may be made of a non-polar organic material or a non-polar inorganic material.

The partition walls may be formed to have a predetermined height and width (e.g., a height of 10 um to 100 um and a width of 10 um to 20 um) through photolithography or mold printing.

Preferably, the partition walls are made of a material that is not charged so that particles charged by electrical force and the partition walls are not bound together during driving. In the embodiment of the present disclosure, when a fluid in which charged particles are mixed is a non-polar organic solvent, a polymer, an organic material, or an inorganic material having a non-polar property, which the same physical property as the fluid, may be used.

The invention claimed is:

1. A display panel structure capable of color implementation, the display panel structure comprising:
   an upper substrate;
   a lower substrate;
   an upper electrode disposed on a surface of the upper substrate;

a lower electrode disposed on a surface of the lower substrate; and
   a display layer formed between the upper substrate and the lower substrate,
   wherein the display layer comprises a plurality of first particles and a plurality of second particles having a color different from that of the plurality of first particles, the first and second particles being dispersed in a fluid, and
   wherein each of the pluralities of first and second particles has a core-shell structure including a core region and a shell region, in which the core region carries a first charge and the shell region carries a second charge different from the first charge, such that one particle has both a positive charge and a negative charge, with the positive and negative charges having different charge amounts from each other,
   wherein each of the pluralities of first and second particles is configured such that cationic and anionic charge amounts have a predetermined ratio by reacting and binding both cationic ligands and anionic ligands to a surface of the first and second particles in a predetermined proportion,
   wherein the one particle includes a positively charged region including the positive charge and a negatively charged region including the negative charge spatially separated from each other, and
   wherein the pluralities of first and second particles are vertically and horizontally arranged at regular intervals from the upper electrode to the lower electrode so as to implement a transmission mode.

2. The display panel structure of claim 1, wherein the display layer further comprises a plurality of third particles exhibiting a third color so as to implement at least three colors.

3. The display panel structure of claim 1, wherein:
   the display layer comprises a plurality of third particles exhibiting a third color;
   each of the plurality of third particles has a structure in which one particle has both a positive charge and a negative charge, and the positive and negative charges have different charge amounts from each other; and
   the plurality of third particles are vertically and horizontally arranged at regular intervals from the upper electrode to the lower electrode so as to implement a transmission mode, as in the case of the first and second particles, and to implement three colors.

4. The display panel structure of claim 1, wherein the display layer further comprises a plurality of third particles exhibiting a third color and a plurality of fourth particles exhibiting a fourth color so as to implement four full colors.

5. The display panel structure of claim 4, wherein each of the pluralities of third and fourth particles exhibiting the third and fourth colors has a structure in which one particle has one of a positive charge and a negative charge so as to implement four full colors.

6. The display panel structure of claim 1, wherein:
   the display layer comprises a plurality of third particles exhibiting a third color and a plurality of fourth particles exhibiting a fourth color;
   each of the pluralities of third and fourth particles has a structure in which one particle has both a positive charge and a negative charge, as in the case of the first and second particles, and the positive and negative charges have different charge amounts from each other; and the pluralities of third and fourth particles are vertically and horizontally arranged at regular intervals from the upper electrode to the lower electrode so as to implement a transmission mode, as in the case of the first and second particles, and to implement four full colors.

\* \* \* \* \*